US005991798A

United States Patent [19]

Ozaki et al.

[11] Patent Number: 5,991,798

[45] Date of Patent: Nov. 23, 1999

[54] PACKAGE MEDIUM SYSTEM HAVING URL HYPER-LINKED TO DATA IN REMOVABLE STORAGE

[75] Inventors: Tomochika Ozaki; Tadashi Kuwabara, both of Yokohama; Toshiyuki Oda, Setagaya-ku; Mika Nishiyama, Yokohama; Takashi Takeuchi, Fujisawa; Jun Miyauchi, Arakawa-ku, all of Japan

[73] Assignees: Hitachi, Ltd.; Hitachi Information Network, Ltd., both of Tokyo, Japan

[21] Appl. No.: 08/857,614

[22] Filed: May 16, 1997

[30] Foreign Application Priority Data

| | | | |
|---|---|---|---|
| May 17, 1996 | [JP] | Japan | 8-123182 |
| Jun. 28, 1996 | [JP] | Japan | 8-168070 |
| Aug. 21, 1996 | [JP] | Japan | 8-219994 |

[51] Int. Cl.[6] .......... G06F 13/00

[52] U.S. Cl. .......... 709/217; 709/206; 705/27; 707/501

[58] Field of Search .......... 705/1, 14, 26, 705/27; 707/501, 10; 709/217, 218, 219, 206

[56] References Cited

U.S. PATENT DOCUMENTS

| | | | |
|---|---|---|---|
| 5,202,828 | 4/1993 | Vertelney et al. | 707/530 |
| 5,418,908 | 5/1995 | Keller et al. | 709/218 |
| 5,696,905 | 12/1997 | Reimer et al. | 705/27 |
| 5,721,832 | 2/1998 | Westrope et al. | 705/27 |
| 5,771,355 | 6/1998 | Kuzma | 709/226 |
| 5,781,901 | 7/1998 | Kuzma | 707/10 |
| 5,781,909 | 7/1998 | Logan et al. | 707/200 |
| 5,790,793 | 8/1998 | Higley | 709/206 |
| 5,799,157 | 8/1998 | Escallon | 705/27 |
| 5,809,512 | 9/1998 | Kato | 707/502 |
| 5,815,663 | 9/1998 | Uomini | 709/206 |
| 5,826,062 | 10/1998 | Fake, Jr. et al. | 709/206 |
| 5,870,717 | 2/1999 | Wiecha | 705/26 |
| 5,877,765 | 3/1999 | Dickman et al. | 345/349 |

OTHER PUBLICATIONS

Michael T. McKeown. "URL Monikers and Active X Hyperlinks". [web page] May 1996; HTTP://channels.microsoft-.com/workshop/networking/moniker/moniker.asp [Accessed Oct. 1, 1998].

"Catalink Direct uses WWW to market proprietary software", Electronic Marketplace Report, Jul. 4, 1995, v9 n13 p.6.

"E–Com: BSC licenses Digital Delivery software for electronic catalog of computer & office equipment supplies", EDGE: Work–Group Computing Report, Jun. 12, 1995, v6 n264 p.7.

"Other electronic document delivery tools", The Seybold Report on Publishing Systems, May 1, 1995, v24 n17 pp.20(8).

Goodman, Danny "The complete HyperCard Handbook", 4th ed., Random House Electronic Publishing, 1993, pp.215–224.

*Primary Examiner*—Dung C. Dinh
*Attorney, Agent, or Firm*—R. William Beard, Jr.; Frohwitter

[57] ABSTRACT

Information obtained through a network and information distributed from a package medium are mixedly displayed. A package medium 3 has a URL (Universal Resource Locator) and information for converting a directory structure in the package medium. A terminal has information for managing correspondence between data of a received electronic mail 6 and a URL of the data. The URL is used for designating data. When the designated URL exists in the terminal, data is read from the terminal. When the designated URL exists in the package medium, data is read from the package medium. The read data is mixedly displayed on one screen.

3 Claims, 26 Drawing Sheets

| URL (901) | PERIOD OF VALIDITY (902) | ATTRIB-UTE (903) | TRANS-MITTER (904) | DATE OF TRANSMISSION (905) | TITLE (906) | |
|---|---|---|---|---|---|---|
| // www. hitachi... | 96/01/01 10:00 | NOT DISPLAY | ABC | 96/06/10 10: | BARGAIN SALE | 907a |
| ••• | | | | | | 907b |
| | | | | | | |
| | | | | | | 907n |

```
                                                          62
Content - Type : text / html ; charset = iso - 2022 - jp
Content - Transfer - Encoding : 8bit

<DirectMail Control Data>
1101  Kind = "Message"                          1106            1107
1102  Expire = "1996 / 06 / 26  12:00 "
1103  Link = " // www. hitachi. co. jp / shop / ID0001 " "May, 1996  ISSUE "
1104  UserDelete = "Yes"
1105a data = "http : // www. hitachi. co. jp / shop / test. html "
1105b data = "http : // www. hitachi. co. jp / shop / test. gif "
      ......
1105n data =
```

FIG. 12

```
Content - Transfer - Encoding : 8bit
Content - Disposition : inline ; filename = "test. html "

<HTML>
<HEAD>
<TITLE>  </ TITLE>
<BASE  HREF = "http : // www. hitachi. co. jp / shop ">
</ HEAD>
<BODY>
 ......
</ BODY>
</ HTML>
```

FIG. 15

```
<HTML>
        <HEAD>
        <TITLE> Mail List </ TITLE>
        </ HEAD>
<BODY>
<H1> LIST OF RECEIVED MAILS </ H1>
<P>
<TABLE BORDER = 1>
<TR VALIGN = CENTER>
      <TD> TRANSMITTER </ TD>
      <TD> DATE </ TD>
      <TD>SUBJECT </ TD>
</ TR>
<TR>
      <TD> <A HREF = "http : // mail / abc. htm"> ABC COMPANY </ A> </ TD>
      <TD> <A HREF = "http : // mail / abc. htm"> 96/06/10 10:10 </ A> </ TD>
      <TD> <A HREF = "http : // mail / abc. htm"> THANK-YOU SALE </ A> </ TD>
</ TR>
<TR>
      <TD> <A HREF = "http : // mail / xyz. htm"> XYZ Ltd. </ A> </ TD>
      <TD> <A HREF = "http : // mail / xyz. htm"> 96/06/14 5:05 </ A> </ TD>
      <TD> <A HREF = "http : // mail / xyz. htm"> NEW PRODUCT SALE </A> </TD>
</ TR>
</ TABLE>

</ BODY>
</ HTML>
```

FIG. 22

FILE NAME INDEX. HTM

```
<HTML>
<! - - VIDEOCD + HTML DOCUMENT - - >
<TITLE> GO GO Ethnic! </ TITLE>
<BODY>
<META HTTP - EQUIV = "Cache" CONTENT = "Expire" >
<META HTTP - EQUIV = "SENDCONTROL" CONTENT = "SendAll" >
<META HTTP - EQUIV = "Connect " CONTENT = "Off" >
<IMG SRC = " . . / GIF / MENU001. GIF">< BR >
<A HREF = "PAGE001. HTM"> 1 < / A>
<A HREF = "PAGE002. HTM"> 2 < / A>
<A HREF = "PAGE003. HTM"> 3 < / A>
< / BODY>
< / HTML>
```

FILE NAME PAGE001. HTM

```
<HTML>
<! - - VIDEOCD + HTML DOCUMENT - - >
<TITLE> Ethnic Curry </ TITLE>
<BODY>
<META HTTP - EQUIV = "Cache" CONTENT = "Expire" >
<META HTTP - EQUIV = "Connect " CONTENT = "Off" >
<A HREF = " . . / . . / VIDEO / VIDEO001. DAT" >
<IMG SRC = " . . / GIF / VIDEO001. GIF">< BR >
HOW TO MAKE Ethnic Curry </ A ><BR >
<A HREF = "INDEX. HTM"> RETURN </ A >
< / BODY>
< / HTML>
```

FILE NAME PAGE003. HTM

```
<HTML>
<! - - VIDEOCD + HTML DOCUMENT - - >
<TITLE> Spices </ TITLE>                                    2201
<BODY>
<META HTTP - EQUIV = "Cache" CONTENT = "Expire" >
<META HTTP - EQUIV = "Connect " CONTENT = "Off" >           2202
<IMG SRC = " . . / GIF / MENU002. GIF"> < BR >
<A HREF = "INDEX. HTM"> RETURN < /A >                       2203
<A HREF = "PAGE004. HTM"> GO TO NEXT SPICE < /A > < BR >
<A HREF = "http : / / www. ethnic. xxx. xxx / spicelst. htm">
ORDER < / A> <BR>
< / BODY>                                                   2204
< / HTML>
```

FIG. 25

FILE NAME spicelst. htm

```
<HTML>
<TITLE> Spice Menu </ TITLE>                                2201
<BODY>
<META HTTP - EQUIV = "Cache" CONTENT = "Keep">
<H3> Spice Menu </ H3> <BR>
<TABLE BORDER>                                              2202
<TR> <TD> <A HREF = "order1. htm" > CUMIN </ A> </ TD>
<TD> 200 YEN </ TD> </ TR>
<TR> <TD> <A HREF = "order2. htm" > CAYENNE PEPPER </ TD>
<TD> 200 YEN </ TD> </ TR>
<TR> <TD> <A HREF = "order3. htm" > CHILI PEPPER </ TD>
<TD> 200 YEN </ TD> </ TR>
  . . .
< / TABLE>
< A HREF = "INDEX. HTM"> RETURN </ A>
< / BODY>
< / HTML>
```

FILE NAME order1. htm

```
<HTML>
<TITLE> Spices Order 1 </TITLE>
<BODY>
<U> ORDER FOR SPICES </ U > <BR>
<IMG SRC = " . . / GIF / SPICE1. GIF"> CUMIN <BR >
¥200 〈BR>
<FORM METHOD = "POST " ACTION = "cgi - bin / post - query"
SENDCONTROL = "Reserve ">
MEMBER ID <INPUT TYPE = "text" NAME = " id " > < BR >
<INPUT TYPE = "submit " VALUE = " CONFIRM ">
<INPUT TYPE = "reset " VALUE = " CANCEL ">
< / FORM>
</ BODY>
< / HTML>
```

2401 2402 2403 2404

PACKAGE MEDIUM SYSTEM HAVING URL HYPER-LINKED TO DATA IN REMOVABLE STORAGE

BACKGROUND OF THE INVENTION

The present invention relates to a technique for reading data from a WWW (World Wide Web) server or a package medium such as a CD-ROM or a DVD-ROM and displaying the read data by using HTML (Hyper Text Markup Language).

As software for accessing data of a WWW server or a package medium by using the HTML, there are Netscape Navigator of Netscape Communications Corporation (U.S.A.), Internet Explorer of Microsoft Corporation (U.S.A.), and the like.

Since the software as mentioned above gathers all information including image data through a network, when a line having slow communication speed such as a telephone line is used, there is a problem that a communication time is long.

When data of a large quantity such as animation is sent by using an electronic mail, since the quantity of the mail is large, there are problems such that a storage is burdened and it takes a lot of time to transfer the data.

Further, the software has a problem such that when data is read from the package medium, a hyper link (link expressed by using HTML) leading to another package medium cannot be performed.

As a multimedia information recording system interactively corresponding to an operation of the user, at present, there is a video-CD which is described in a magazine "Nikkei Electronics" (Nov. 8, 1993). According to the video-CD, video data such as a moving image and a still image and audio data such as music and effect sounds is recorded in a CD-ROM and reproduction control data as information for reproducing and controlling the video data and the audio data in correspondence to the operation of the user is also recorded. By recording the reproduction control data, the video-CD realizes a reproduction interactively with the user. A file system according to the ISO9660 standard is defined as a recording system of the CD-ROM and the video-CD is a personal computer corresponding to the file system. The video-CD can be easily reproduced by a personal computer having a reproducing means of the video data (according to the MPEG standard).

In addition, an information recording and reproducing system called a WWW (World Wide Web) of the internet is famous as a system for interactively reproducing the multimedia data via a network.

FIG. 27 shows a construction of an interactive video recording and reproducing system which has been already proposed by the applicant of the present invention.

In FIG. 27, an optical disk medium 101 has the following regions. That is, the optical disk medium 101 is constructed by: a disk identifying information recording region 102 in which an identifier for specifying the recording contents of the disk is recorded; an HTML (Hyper Text Markup Language) information recording region 103 in which a file in the HTML format that defines association between a document and multimedia data or association between documents is recorded; a multimedia data recording region 104; and an executable program recording region 105 in which an executable program for making a specific reproducing apparatus operative is recorded. For example, a CD-ROM or the like is used as the optical disk medium 101.

In addition to an optical disk reproducing means, an interactive video reproducing means 106 for reproducing the optical disk medium 101 has a communication means for communicating with an interactive video transmitting means 108 via a communication medium 107. Further, the interactive video reproducing means 106 communicates with an internet server 110 which can be connected via the interactive video transmitting means 108 and the internet 109.

The interactive video transmitting means 108 communicates with the interactive video reproducing means 106 via the communication medium 107 and sends proper HTML data in response to a URL(Univeral Resource Locator) requested by the interactive video reproducing means 106. Such an interactive video transmitting means 108 is generally called a WWW server or the like. If the communication medium 107 is a medium which can transmit the URL and HTML data, a combination of a telephone line and the PPP (Point-to-Point Protocol), a combination of Ethernet and the TCP/IP (Transmission Control Protocol/Internet Protocol), and other systems can be also used.

According to an interactive video recording and reproducing system described above, data recorded in the optical disk medium 101, which is obtained via communication means is reproduced.

FIG. 28 shows an example of a structure of a directory in the optical disk medium 101. The directory structure is recorded by using the ISO9660 standard (standard regarding a disk structure of a CD-ROM). FIG. 28 shows a tree structure of a logical hierarchy of the directory. When a name shown in a knot in the tree structure is a directory name, it is shown in brackets (<and >). If it is a file name, it is shown without brackets. For example, <ROOT> denotes a root directory including some sub-directories and DISKID indicates a file.

Files names in the optical disk medium 101 will be described by partitioning directories with slashes (/) hereinafter. With respect to <ROOT>, the directory name is omitted. For example, <ROOT>–<WWW>–<HTML>–INDEX.HTM is described as /WWW/HTML/INDEX.HTM.

The disk identifying information recording region 102, HTML information recording region 103, multimedia data recording region 104, and executable program recording region 105 shown in FIG. 27 correspond to regions 201, 202, 203, and 204 surrounded by dotted lines in FIG. 28, respectively.

In the disk identifying information recording region 201, a file having a name of DISKID is recorded. In this file, information specifying the disk from disks of different kinds, such as the maker of the disk, recording contents of the disk, and title of the disk is recorded.

In the HTML information recording region 202, a file in the HTML (Hyper Text Markup Language) format which is widely used in the WWW (World Wide Web) of the internet (in the diagram, files each having an extension of HTM in the <HTML> directory) is recorded. HTML intends to describe the association between a document and multimedia data or the association between documents. HTML defines here the association between the file (document) recorded in the HTML information recording region 202 and the multimedia data recorded in the multimedia data recording region 203, the association between an HTML file and multimedia data obtained via the communication medium 107, and the like.

In the multimedia data recording region 203, still image data (in the diagram, files each having an extension of GIF in the <GIF> directory), moving image data (in the diagram, files each having an extension of DAT in the <MPEG> directory), audio data (not shown), and the like are recorded. In the diagram, multimedia data is recorded in both of the <ROOT>–<WWW> directory and the <ROOT>–<APPEND> directory. A file recorded in the former one of <WWW> is referred to from a file in the HTML format (file having the extension of HTM) recorded in the HTML information recording region 202. On the contrary, the file recorded in the latter one of <APPEND> is not referred to.

An executable program for acquiring and reproducing data recorded in the optical disk medium 101 and data obtained through the communication medium 107 is recorded in the executable program recording region 204. In the diagram, a program file (/PCAP/WWWVIEW.EXE in the diagram) is recorded in a directory having a name of <PCAP>. In a file (in a diagram, it is shown as /AUTORUN.INF) which is directly recorded in the root directory, a program activating procedure (executable program name, name of a file to be reproduced first by a program, and the like) is recorded. In the diagram, it is assumed that /PCAP/WWWVIEW.EXE is defined as an executable program and /WWW/HTML/INDEX.HTM is defined as a file to be reproduced first among items to be recorded in the program activating procedure.

FIG. 29 shows association of multimedia data using the interactive video recording system. In the diagram, data in a region 301 surrounded by a dotted line is data recorded in the optical disk medium 101. Data in a region 302 is data recorded in the interactive video transmitting means 108. Data in a region 303 is data recorded in the internet server 110.

As a file to be reproduced first, WWW/HTML/INDEX.HTM is selected according to the program activating procedure shown in FIG. 28. As the reproducing contents of INDEX.HTM, it is defined to refer to a still image /WWW/GIF/MENU001.GIF recorded in the optical disk medium 101 in addition to a text display and the like. /WWW/HTML/PAGE.HTM is also defined in INDEX.HTM as an association to other documents. Reference to the multimedia data and a transition to the HTML file are performed by a description called a tag of HTML.

When the association from INDEX.HTM to PAGE.HTM is selected in order to move to the reproduction file, in a manner similar to the reproduction of INDEX.HTM, reproduction of a text or multimedia data and transition to another document are performed according to the definition of PAGE.HTM. In the diagram, a still image file of /WWW/GIF/MENU0002.GIF and a moving image file of /WWW/MPEG/VIDEO001.DAT are referred to as multimedia data. A file having a name of AD001.HTM recorded in the interactive video transmitting means 108 is defined as a document to be jumped to.

In the contents of AD001.HTM recorded in the interactive video transmitting means 108, as multimedia data to be moved to, the still image file /APPEND/GIF/AD001.GIF recorded in the optical disk medium 101 is defined. As a document to be moved to, a file TOPIC001.HTM in the HTML format recorded in the same interactive video transmitting means 108 is defined. In the contents of TOPIC001.HTM, as multimedia data to be referred to, a moving image file /APPEND/MPEG/AD001.DAT recorded in the optical disk media and a still image file TOPIC001.GIF recorded in the interactive video transmitting means 108 are defined. As a document to be moved to, a file NEWS.HTM in the HTML format recorded in the internet server 110 is defined.

In the contents of NEWS.HTM, it is defined to refer to a still image file NEWS.GIF recorded in the same internet server 110.

Generally, a file in the HTML format has text data, so that a file size is small. Even in the case of obtaining the file via the communication medium 107, it can be obtained in a short communication time. On the contrary, since the multimedia data such as still image and moving image has a large file size, it is difficult to obtain it in a short communication time. In the system, even when the file in the HTML format (AD001.HTM, TOPIC001.HTM) is obtained via the communication medium 107, since the file (AD001.GIF, AD001.DAT) which can be reproduced from the optical disk medium 101 as multimedia data to be referred to from the file is associated, the communication time can be largely reduced.

In the system configuration of the interactive video recording and reproducing system, data obtained from a network is stored in a temporary storing memory in interactive video reproducing means so as to shorten a time accessing the same information. However, the capacity of the temporary storing memory is limited, so that when the memory becomes full, a process for deleting stored data is performed.

It is not necessary to keep connecting the network while data of the optical disk medium is referred to.

Although a command to be transmitted to a network is instantaneously transmitted under the present situation, the command is temporarily stored and when a plurality of commands are gathered, they are transmitted in a lump, thereby enabling the number of probabilities of a communication session to be reduced.

Information displaying method and apparatus for linking and displaying information obtained from both of a CD-ROM and a communication medium are used for sales by mail order or the like, as introduced in a magazine "Nikkei Multimedia" (No. 2, August, 1995). Information of the CD-ROM and information obtained through the communication medium is described in different methods and a communication is executed in cooperation with a communication of a personal computer.

As a language for forming a home page corresponding to a WWW (World Wide Web) server of the internet, for example, there is HTML (Hyper Text Markup Language) which is recognized as a standard language with the growing popularity of the WWW. The WWW browser is recognized as software indispensable for accessing to the internet.

In the conventional technique as mentioned above, since data of the CD-ROM and data obtained through the communication medium is formed by peculiar description systems in respective information storing media, there is no compatibility between the systems. Information obtained by communication cannot be used with other information and formation of contents is troublesome. It takes time to receive information due to a problem of an internet connecting environment, so that operability is not good, and the user has to worry about communication costs.

When information on the CD-ROM is displayed by using the WWW browser in a manner similar to a display of information from the communication medium, different from the internet access which is obviously recognized as a communication, it is desirable to notify the user of a fact that the information medium of the present or next display information is the CD-ROM or the communication medium. In addition, there is a desirable function such that transition between information not mutually linked can be easily realized like a case of returning to information on the CD-ROM after Net surfing with the WWW communication.

SUMMARY OF THE INVENTION

It is an object of the invention to solve the problems and to transmit data of a small quantity such as a text to a terminal in a network and to read out data of a large quantity such as a moving image from a package medium inserted into the terminal. By leading a hyper link to another package medium, the hyper link is freely performed between the package media.

It is an other object of the invention to provide an interactive video recording and reproducing system which can be used more easily by writing information necessary for the above controls in a description of HTML.

It is an object of the invention to propose information display method and apparatus for linking and displaying information stored in a plurality of information storing means and to provide information storing means, wherein the user can easily preliminarily confirm information storing means to be used.

It is an object of the invention to provide information displaying method and apparatus for linking information stored in peculiar information storing means such as a CD-ROM and information stored in common information storing means such as a WWW server connected via a communication medium and displaying the information, and to provide peculiar information storing means, wherein information to be displayed is easily selected and storing means for storing the information can be easily confirmed.

In order to achieve the object, according to the invention, a package medium stores the following data:

(1) a disk management table for identifying information stored in the package medium, and (2) a disk link management table for managing information regarding the package medium in which information specified by the hyper link is stored.

A terminal is provided with a storing means for storing the following data:

(3) a cache management table for managing an identifier of a file stored in the terminal, and (4) a server management table for managing information of a server to which the terminal is connected.

Further, the following information is stored in an electronic mail:

(5) mail control data such as a period of validity of the electronic mail, an identifier of contents data, a flag for designating display/not-display of the mail, and disk link information (information specified by the hyper link referred to by the mail is described in the disk link information), and (6) contents data for updating data displayed to the user or the contents of the package medium.

In order to manage mails, the terminal stores the following data:

(7) a mail management table for managing mails transmitted to the terminal, and (8) a disk link management table for managing information regarding a package medium in which information specified by the hyper link referred to by the mail is stored.

In the terminal, the control data of the received mail is registered in both of the mail management table and the disk link management table, the information identifying the contents data of the mail is registered in the cache management table, and the received mail is registered by storing the data contents in the storing means provided for the terminal.

The terminal has communication means for communicating with a server and data display means for displaying data on a screen.

The data display means reads out requested data from the package medium, server, or storing means in the terminal by using data acquiring means. The data acquiring means reads out the data by the following procedure.

(1) The cache management table is checked. If the requested data is registered in the storing means in the terminal, the data is read out from the storing means in the terminal.

(2) If it is not registered, the disk management table is checked. When it is found by the check that the data is registered in the package medium, the data is read out from the package medium.

(3) When the data is not in a disk, both of the disk link management table stored in the storing means in the terminal and the disk link management table registered in the package medium are checked. When it is found by the check that the data exists in another package medium, a process selecting dialog is displayed by process selecting means. In the process selecting dialog, information regarding the package medium in which the requested data exists obtained from the disk link management table is displayed and the user is allowed to select whether the information is read from another package medium or read out from the server.

(4) When the user designates to read information from another package medium, the processing routine is returned to the step of (3).

(5)When the user instructs to read information from the server, the server is designated and the data is read out by the communication means. According to the invention, in order to achieve the object, interactive video data is recorded and reproduced by using an internet server comprising: storing means for storing a moving image, a still image, audio data, multimedia data as a combination of those data, and link information for defining a reproducing procedure of the multimedia data; reproducing means for reproducing the multimedia data in accordance with the link information and obtaining new link information via a network; and means for analyzing an acquisition request of the reproducing means received via the network.

According to an interactive video recording and reproducing system of the invention, an interactive video recording and reproducing apparatus comprises: interactive video reproduction control means; reproducing means of first interactive video storing means; operation input means; display means; interactive video temporary storing means; transmission command temporary storing means; and communication means to be connected to a network, wherein link information recorded in the first or second interactive video storing means includes a description for recording or deleting data which is stored in the interactive video temporary storing means in the interactive video recording and reproducing apparatus.

The link information recorded in the first or second interactive video storing means includes a description for controlling a transmission of a command which is stored in the transmission command temporary storing means in the interactive video recording and reproducing apparatus.

The link information recorded in the first or second interactive video storing means includes a description for connecting or disconnecting the communication means of the interactive video recording and reproducing apparatus to/from the network.

The interactive video recording and reproducing apparatus does not have to have all of the means but may have only means necessary to achieve a requested function.

According to the invention, in order to achieve the object, there are provided information display method and apparatus for linking information of peculiar information storing means and information obtained from common information storing means through a communication medium by description information display control means and displaying the information, wherein a name of information which can be linked and an icon image for expressing storing means to which the information belongs are displayed, a communication start notifying page is displayed when a display of information belonging to the peculiar information storing means is moved to a display of information belonging to the common information storing means, and a display for notifying of an information storing means by displaying a cursor and an icon image expressing an information storing medium to which information which is presently being displayed or to be selected and displayed next belongs.

A CD-ROM that stores information in a common description format of the HTML format is used as the peculiar information storing means. A WWW server that stores information in the common description format of the HTML format is used as the common information storing means. In the CD-ROM, page information for displaying a name of information which can be selected and an image expressing storing means to which the information belongs is stored.

The description information display control means is constructed by a personal computer in which the WWW browser is installed. Transition history information of displayed information is held and is displayed in a tree structure and the displayed information is again displayed according to the transition history information.

BRIEF DESCRIPTION OF DRAWINGS

FIG. 11 is a diagram illustrating a specific example of a control part in FIG. 10;

FIG. 12 is a diagram illustrating a specific example of data in FIG. 10;

FIG. 15 is a diagram showing an example of an HTML file for displaying the received mail list formed by the procedure shown in FIG. 14;

FIG. 22 is a diagram showing the contents of INDEX.HTM;

FIG. 23 is a diagram showing the contents of a PAGE001.HTM file;

FIG. 24 is a diagram showing the contents of a PAGE003.HTM file;

FIG. 25 is a diagram showing the contents of a spicelst.htm file;

DETAILED DESCRIPTION OF PREFERRED EMBODIMENTS

Embodiments of the invention will be described hereinbelow with reference to the drawings.

A system configuration according to the invention will be described first with reference to FIG. 2.

In the diagram, a terminal 1 used in the invention has a display 2 such as, for example, a CRT (Cathode Ray Tube) display. A server 4 such as a WWW server or a mail server for storing data accessed by the terminal 1 is connected to the terminal 1 via a network such as a telephone line 5. A package medium 3 in which data used by the terminal 1 is stored is, for example, a CD-ROM or a DVD-ROM.

In such a system configuration, data is supplied from the package medium 3 or the server 4 via the network such as the telephone line 5 to the terminal 1.

Figure 2:
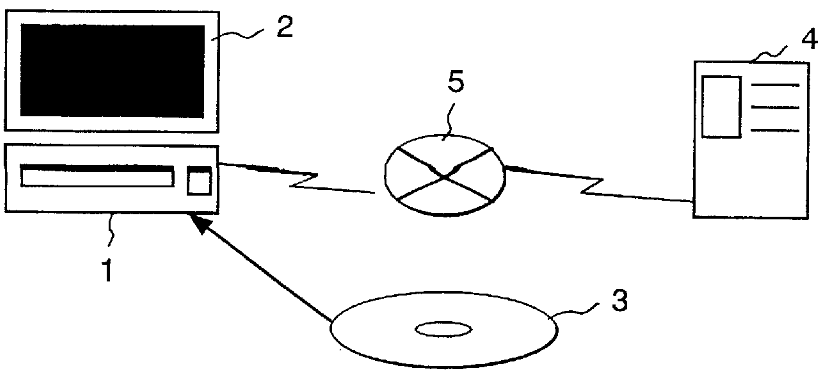
FIG. 2 is a diagram illustrating an example of a system configuration according to the invention.
Figure 3:
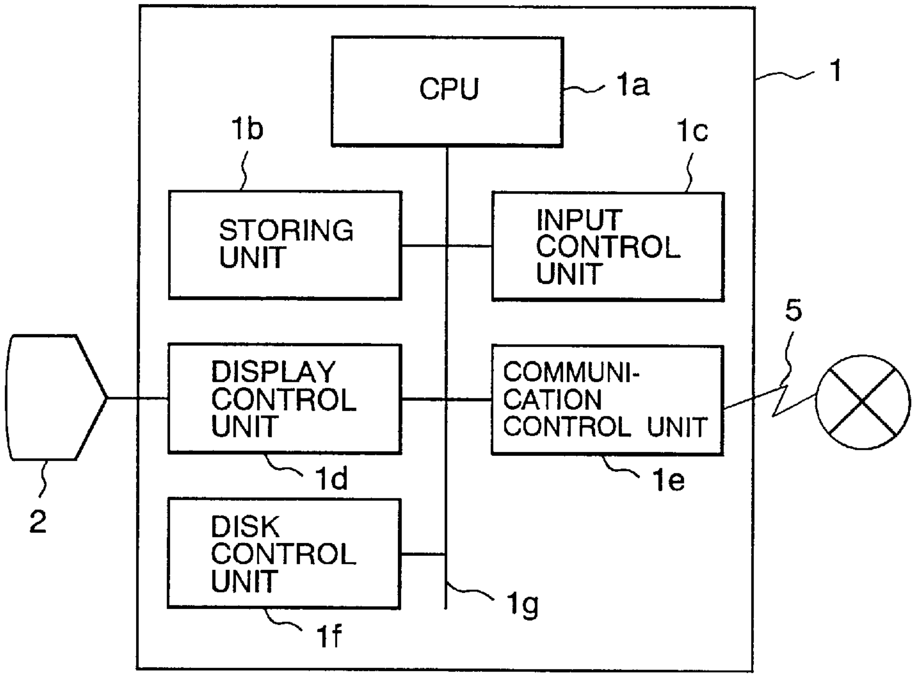
FIG. 3 is a block diagram showing a hardware construction of a terminal in FIG. 2.

FIG. 3 is a block diagram showing a hardware construction of the terminal 1 in FIG. 2. The terminal 1 comprises a control unit 1*a*, a storing unit 1*b*, an input unit 1*c*, a display control unit 1*d*, a communication control unit 1*e*, a disk control unit 1*f*, and a bus 1*g*.

In the diagram, the control unit la executes various programs regarding controls of peripheral equipment and data processes and communication. The storing unit 1*b* stores data and is constructed by, for example, an RAM, an ROM, a flash memory, a hard disk, and the like. The input unit 1*c* processes an input from the user and is constructed by, for example, a mouse, a tablet, a remote controller, and a driver for controlling these parts.

The display control unit 1*d* controls data to be displayed on the display 2 connected to the terminal 1. The communication control unit 1*e* controls a communication with the server 4 (FIG. 2) and is constructed by, for example, a modem and driver software for controlling the modem. The disk control unit 1*f* is constructed by a drive for reading data from the package medium 3 (FIG. 2) and driver software for controlling the drive.

The control unit 1*a*, storing unit 1*b*, input unit 1*c*, display control unit 1*d*, communication control unit 1*e*, and disk control unit 1*f* are mutually connected via the bus 1*g*.

Figure 4:
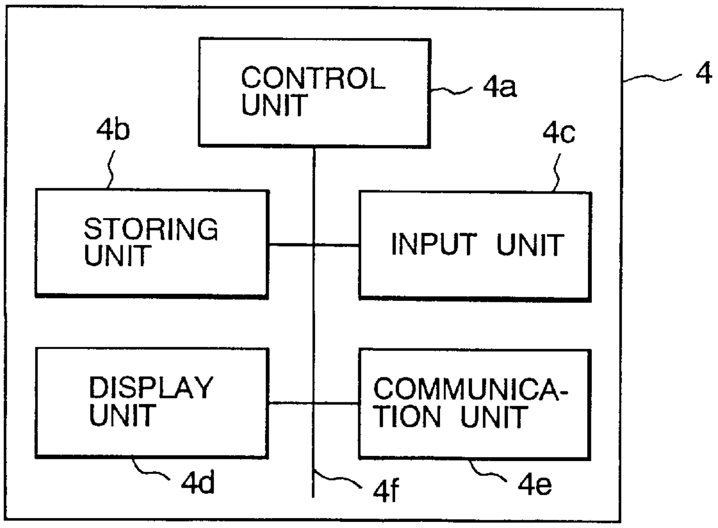
FIG. 4 is a block diagram showing a hardware construction of a server in FIG. 2.

FIG. 4 is a block diagram showing a hardware construction of the server 4 in FIG. 2. The server 4 comprises a control unit 4*a*, a storing unit 4*b*, an input unit 4*c*, a display unit 4*d*, a communication unit 4*e*, and a bus 4*f*.

In FIG. 4, the control unit 4*a* executes various programs regarding controls of peripheral equipment, data processes and communication. The storing unit 4*b* stores data and is constructed by, for example, an RAM, an ROM, a flash memory, a hard disk, and the like. The input unit 4*c* processes an input from the user and is constructed by, for example, a keyboard, a mouse, and a driver for controlling the keyboard and the mouse. The display unit 4*d* is constructed by a CRT display and driver software for controlling display data. The communication unit 4*e* communicates with the terminal 1 (FIG. 2) and is constructed by, for example, a modem and driver software for controlling the modem. The control unit 4*a*, storing unit 4*b*, input unit 4*c*, display unit 4*d*, and communication unit 4*e* are mutually connected by the bus 4*f*.

Figure 1:
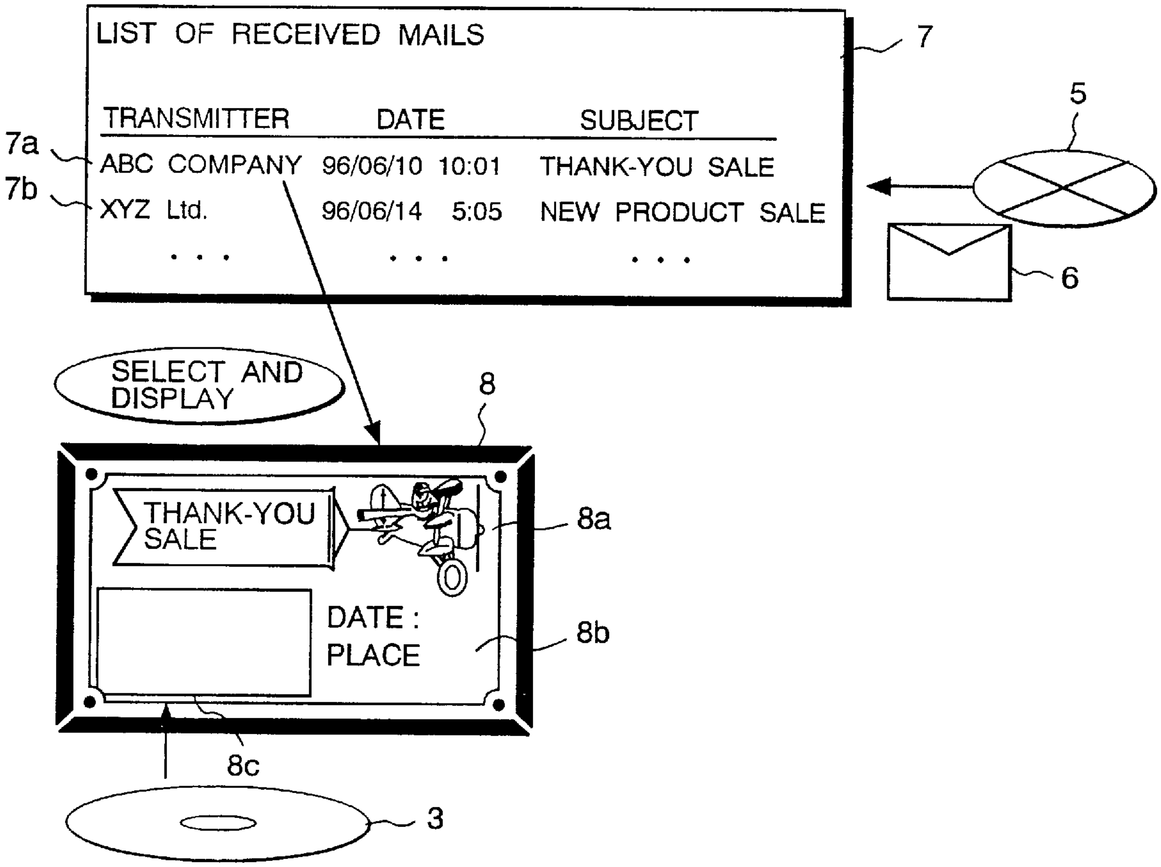
FIG. 1 is a diagram showing an example of an operation of an embodiment of a terminal according to the invention.

FIG. 1 is a diagram showing an example of an operation of a terminal according to an embodiment of the invention. Reference numeral 6 denotes an electric mail (e-mail), 7 a screen, 7*a* and 7*b* mail lists, 8 a display screen, 8*a* an image, 8*b* a text, and 8*c* an animation and component elements corresponding to those in FIG. 2 are designated by the same reference numerals.

In FIG. 1, it is assumed that the screen 7, as shown, for displaying a list of the e-mails 6 sent from the server 4 is displayed on the display 2 of the terminal 1. The e-mails 6 are displayed in a list as shown by the mail lists 7*a* and 7*b*. When the user of the terminal 1 selects either the mail list 7*a* or 7*b*, the contents of the selected mail list is displayed on the display 2.

The screen 8 shows an example of the contents of the e-mail 6 displayed on the display 2. It is assumed that the image 8*a*, text 8*b*, and animation 8*c* are displayed on the display screen 8. The text 8*b* is data sent via the telephone line 5 (FIG. 2) and the image 8*a* and animation 8*c* are data obtained from the package medium 3 (FIG. 2).

As mentioned above, in the embodiment, the data obtained from the package medium 3 and data supplied from the server 4 (FIG. 2) via the network (telephone line 5) can be displayed on the same screen.

Data to be used by the terminal 1 for realizing the above function will be described with reference to FIGS. 5 to 10.

Figure 5:
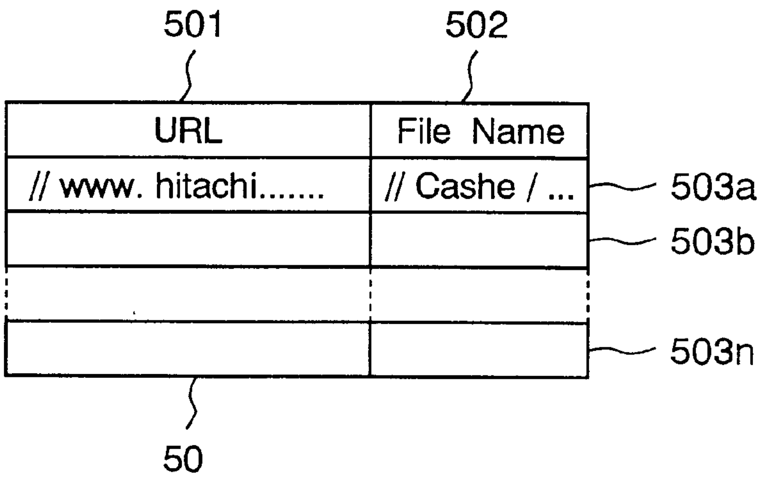
FIG. 5 is a diagram showing a construction of a cache management table for managing files stored in the terminal in FIG. 2.

FIG. 5 is a diagram showing a construction of a cache management table 50 for managing files stored in the terminal 1.

In the diagram, each of records 503*a*, 503*b*, . . . , 503*n* of the cache management table 50 is constructed by a URL (Universal Resource Locator) 501 as information for specifying a location where the file is stored and a file name 502. The file name 502 is a name of a file stored in the terminal 1 and the URL 501 corresponds to the file name 502.

The cache management table 50 is stored in the storing unit 1*b* in the terminal 1. The URL is described in detail in "Universal Resource Locators (URL)", RFC1738, October, 1994.

Figure 6:
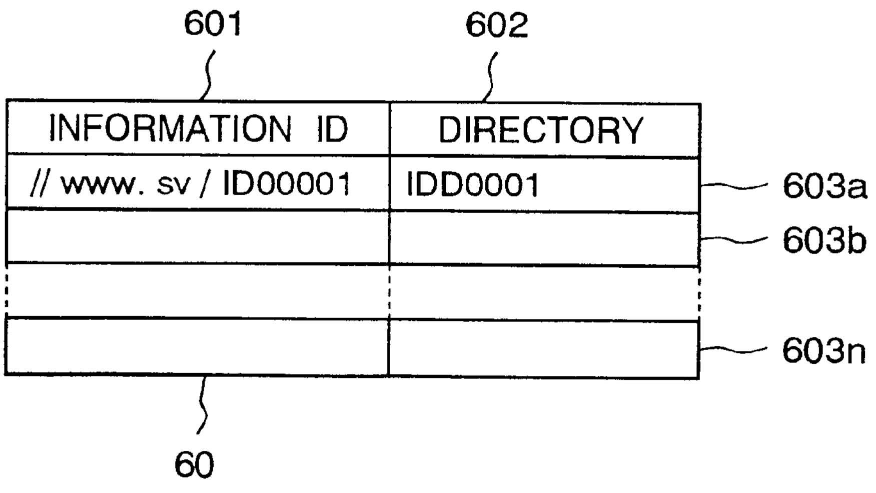
FIG. 6 is a diagram showing a construction of a disk information management table for managing correspondence between a URL of the cache management table in FIG. 5 and a directory of a package medium in FIG. 2.

FIG. 6 is a diagram showing a construction of a disk information management table 60 for managing correspondence between the URL 501 in the cache management table 50 and the directory of the package medium 3.

In FIG. 6, each of records 603*a*, 603*b*, . . . , 603*n* of the disk information management table 60 is constructed by an information ID 601 and a directory 602. The directory 602 is a directory on the package medium 3 and the information ID 601 is an URL corresponding to the directory 602.

The disk information management table 60 is stored in the package medium 3. The terminal 1 reads the disk information management table 60 via the disk control unit 1*f* (FIG. 3). For example, when the disk information management table 60 in which the information ID 601 is //www.hitachi.co.jp/shop1/ID001 and the directory 602 has a record of ID0001 is stored in the package medium 3, it indicates that information lower than the directory of /shop1/ID001 of the server 4 specified by "//www.hitachi.co.jp" is stored in the package medium 3.

Figure 7:
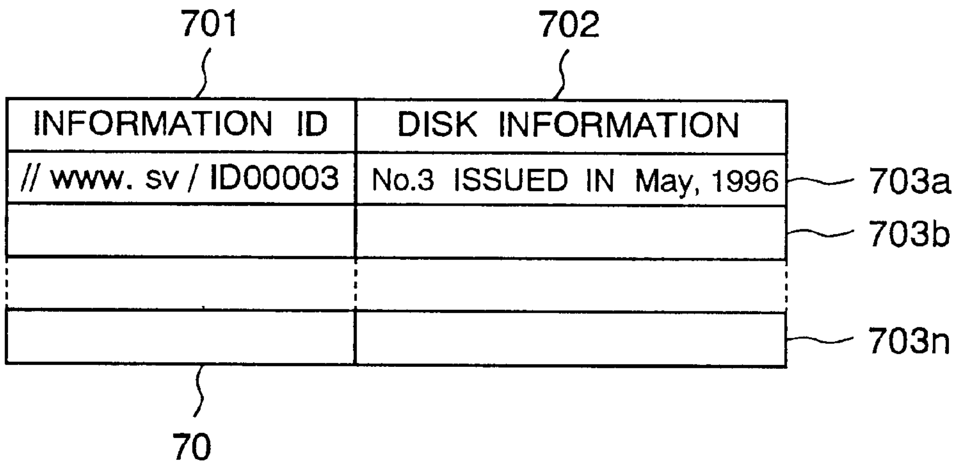
FIG. 7 is a diagram showing a construction of a disk link management table for managing corresponding relation between the URL in FIG. 5 and a package medium in which information specified by the URL is stored.

FIG. 7 is a diagram showing a construction of a disk link management table 70 for managing the corresponding relation between the URL and the package medium 3 in which information specified by the URL is stored.

In the diagram, each of records 703*a*, 703*b*, . . . , 703*n* of the disk link management table 70 is constructed by an information ID 701 and disk information 702. The information ID 701 is a URL for specifying the location of data. The disk information 702 is information regarding the package medium 3 in which data specified by the information ID 701 is stored. The disk information 702 is a character string such as "No. 5 issued in May, 1996".

The disk link management table 70 is stored in both of the package medium 3 and the storing unit 1*b* in the terminal 1.

Figure 8:
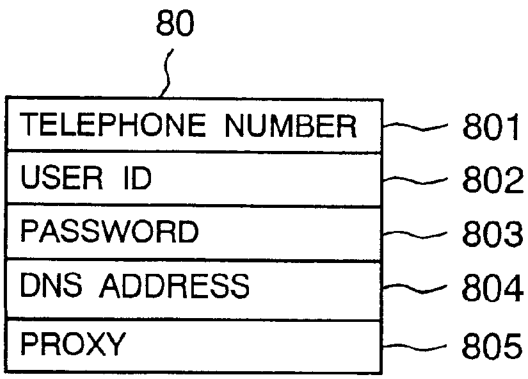
FIG. 8 is a diagram showing a construction of a server management table for managing information of a server in FIG. 2.

FIG. 8 is a diagram showing the construction of a server management table 80 for managing information of the server 4 to which the terminal 1 is connected.

In the diagram, the server management table 80 is constructed by a telephone number 801, a user ID 802, a password 803, a DNS address 804, and a proxy 805. The telephone number 801 is a telephone number of the server 4. The user ID 802 is a user identifier for logging in the server 4. The password 803 is used for the user specified by the user ID 802 to log in the server 4. The DNS address 804 is an IP address of a domain name server. Further, the proxy 805 is used to designate a proxy server.

The server management table 800 is stored in the storing unit 1*b* (FIG. 3) in the terminal 1.

Figures 9, 10:
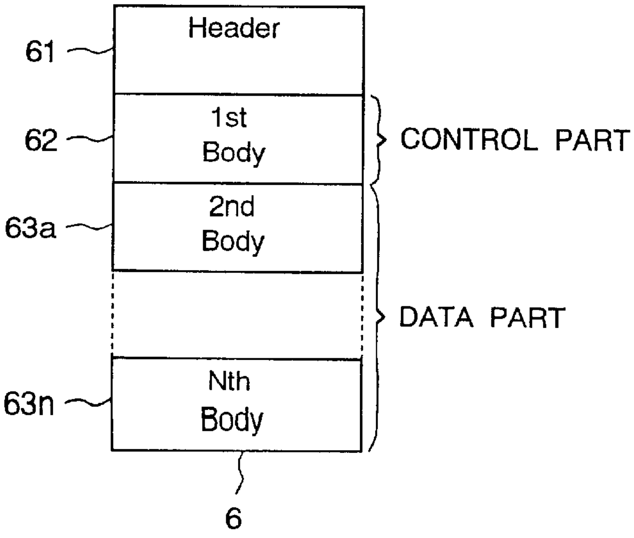
FIG. 9 is a diagram showing a construction of a mail management table for managing electronic mails sent to a terminal in FIG. 2.
FIG. 10 is a diagram showing a construction of the electronic mail according to an embodiment of the invention, which is used in the terminal in FIG. 2.

FIG. 9 is a diagram showing the construction of a mail management table 90 for managing the e-mail 6 sent to the terminal 1.

In the diagram, each of records 907*a*, 907*b*, . . . , 907*n* of the mail management table 90 is constructed by a URL 901, a period of validity 902, an attribute 903, a transmitter 904, date of transmission 905, and a title 906. The URL 901 is a URL of a mail of the record and is used as an identifier of the mail. The period of validity 902 is a period of validity of the mail specified by the URL 901. The attribute 903 is used to designate whether the mail specified by the URL 901 is "displayed" or "not displayed". The transmitter 904 is information for identifying the transmitter of the mail. The date of transmission 905 is a date when the transmitter 904 sent the mail. Further, the title 906 is a title given to the mail.

The mail management table 90 is stored in the storing unit 1*b* (FIG. 3) in the terminal 1.

FIG. 10 is a diagram showing a construction of the e-mail 6 according to an embodiment of the invention, which is used in the terminal 1.

In the diagram, the e-mail 6 is constructed by a multi-part body by using MIME (Multipurpose Internet Mail Extensions) as a standard of the mail used in the internet. Reference numeral 61 denotes a header used in the MIME. Reference numerals 62, 63*a*, . . . , 63*n* are bodies of the mail. The control part 62 is the first body in which the period of validity of the e-mail 6 and control information for controlling so as to display or not to display are stored. In the bodies 63*a*, . . . , 63*n*, data displayed to the user and media for updating the contents of the package medium 3 are stored.

The MIME is described in "MIME (Multipurpose Internet Mail Extensions), Part One: Mechanisms for Specifying and Describing the Format of Internet Message Bodies", RFC1521, September, 1993.

FIG. 11 is a diagram showing a specific example of the control part 62 in FIG. 10.

In FIG. 11, the following information is described in the control part 62:

(1) display.not-display attribute 1101

(2) period of validity 1102

(3) disk link information 1103

(4) user deletion flag 1104

(5) data URLs 1105*a*, 1105*b*, . . . , 1105*n*

The display.not-display attribute 1101 is information describing whether the contents of the mail are displayed to the user or not. For example, when the value is "Message", the contents of the mail are displayed to the user. When the value is "Update", they are not displayed to the user. The mail which is not displayed to the user is used when a part of the contents of the package medium 3 is updated in appearance.

The period of validity 1102 is the period of validity of the mail. The mail after the period of validity is deleted.

The disk link information 1103 is constructed by an information ID 1106 and disk information 1107. The URL is written in the information ID 1106 and information regarding the package medium 3 storing the information specified by the information ID 1106 is written in the disk information 1107. A plurality of disk link information 1103 can also exist.

The user deletion flag 1104 is a flag indicating whether the mail can be deleted by the user or not. For example, in case of "yes", the user can delete the mail.

The URLs corresponding to the data 63*a* to 63*n* (FIG. 10) of the e-mail 6 are written in the data URLs 1105*a*, . . . , 1105*n*, respectively.

FIG. 12 is a diagram showing a specific example of the data 63*a* to 63*n* in FIG. 10 and a case where the contents of data is written with HTML (Hyper Text Markup Language). The data is not necessarily written with HTML.

A received mail registering process 1300 of the terminal 1 (FIGS. 2 and 3) which is executed when the e-mail 6 is received will be described with reference to FIG. 13.

Figure 13:
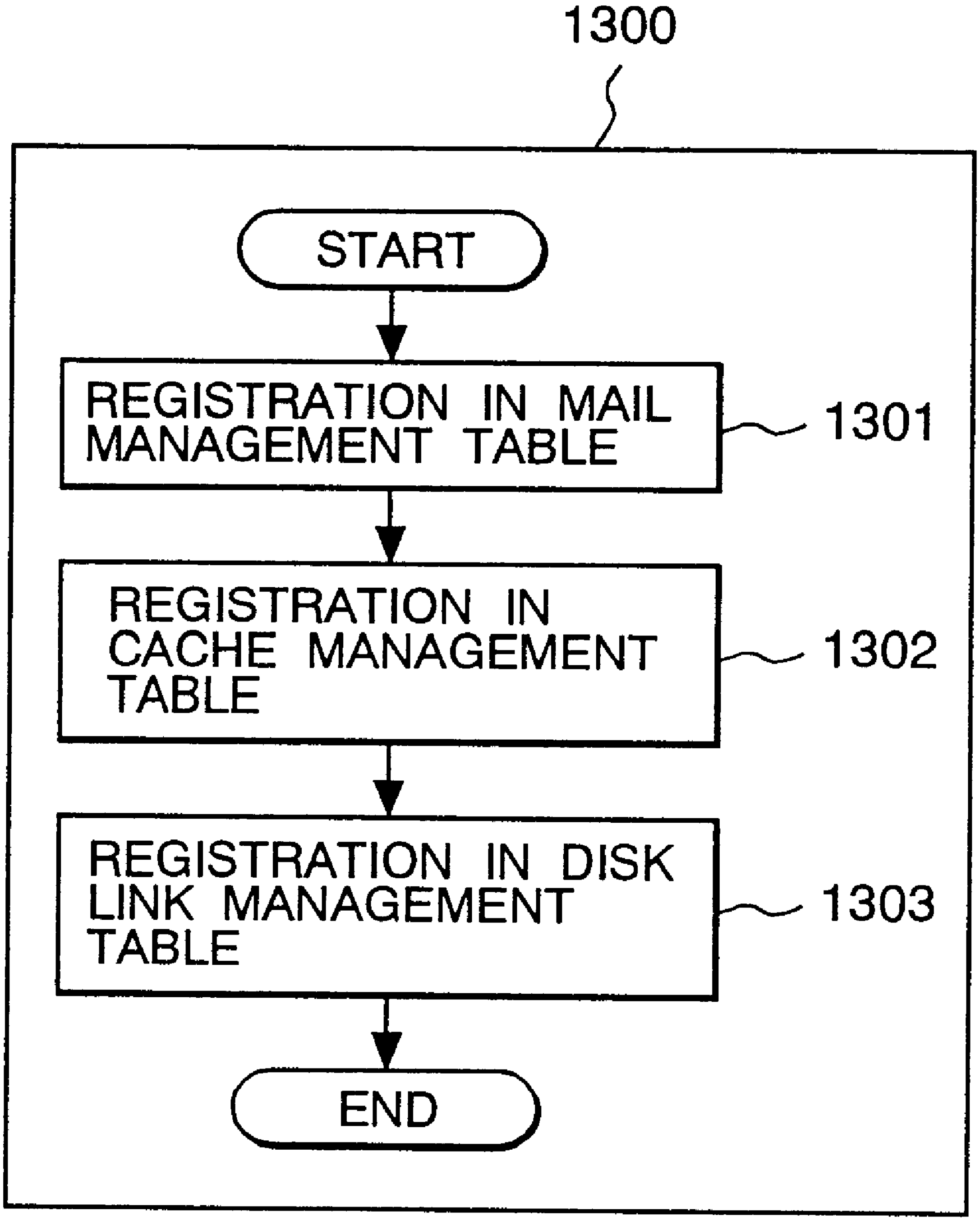
FIG. 13 is a flowchart for a received mail registering process of the terminal in FIG. 2, which is executed when an electronic mail is received.

In FIG. 13, a new record 907 is added to the mail management table 90 shown in FIG. 9. The data URL 62 of the control part 62 (FIG. 10) of the received mail is stored in the URL 901 of the added record 907. The period of validity 1102 (FIG. 11) is stored in the period of validity 902. The contents of the display/not-display attribute 1101 (FIG. 11) are stored in the attribute 903 (step 1301). When a plurality of data 63 (FIG. 10) exist in step 1301, step 1301 is repeated a plurality of times.

Subsequently, a new record 503 is added to the cache management table 50 shown in FIG. 5. The contents of the data URL 1105 (FIG. 11) of the received e-mail 6 are stored in the URL 501 of the added record 503. The contents of the data 63 (FIG. 10) corresponding to the data URL 1105 are stored in a cache. In this instance, file names are designated, for example, numbers are displayed sequentially from 1. The file name is stored in the file name 502 (step 1302). When a plurality of data 63 (FIG. 10) exist in step 1302, step 1302 is repeated a plurality of times.

A new record 703 is added to the disk link management table 70 (FIG. 7) stored in the storing unit 1*b* (FIG. 3). The contents of the information ID 1106 are stored in the information ID 701 of the added record 703 and the contents of the disk information 1107 are stored into the disk information 702, respectively (step 1303). When a plurality of disk link information 1103 exist, the process of step 1303 is repeated a plurality of times.

The cache denotes a region for storing the file assured in the storing unit 1*b* (FIG. 3). In order to receive the e-mail 6, a protocol such as POP3 which is standardly used for receiving the e-mails in the internet is used.

Figure 14:
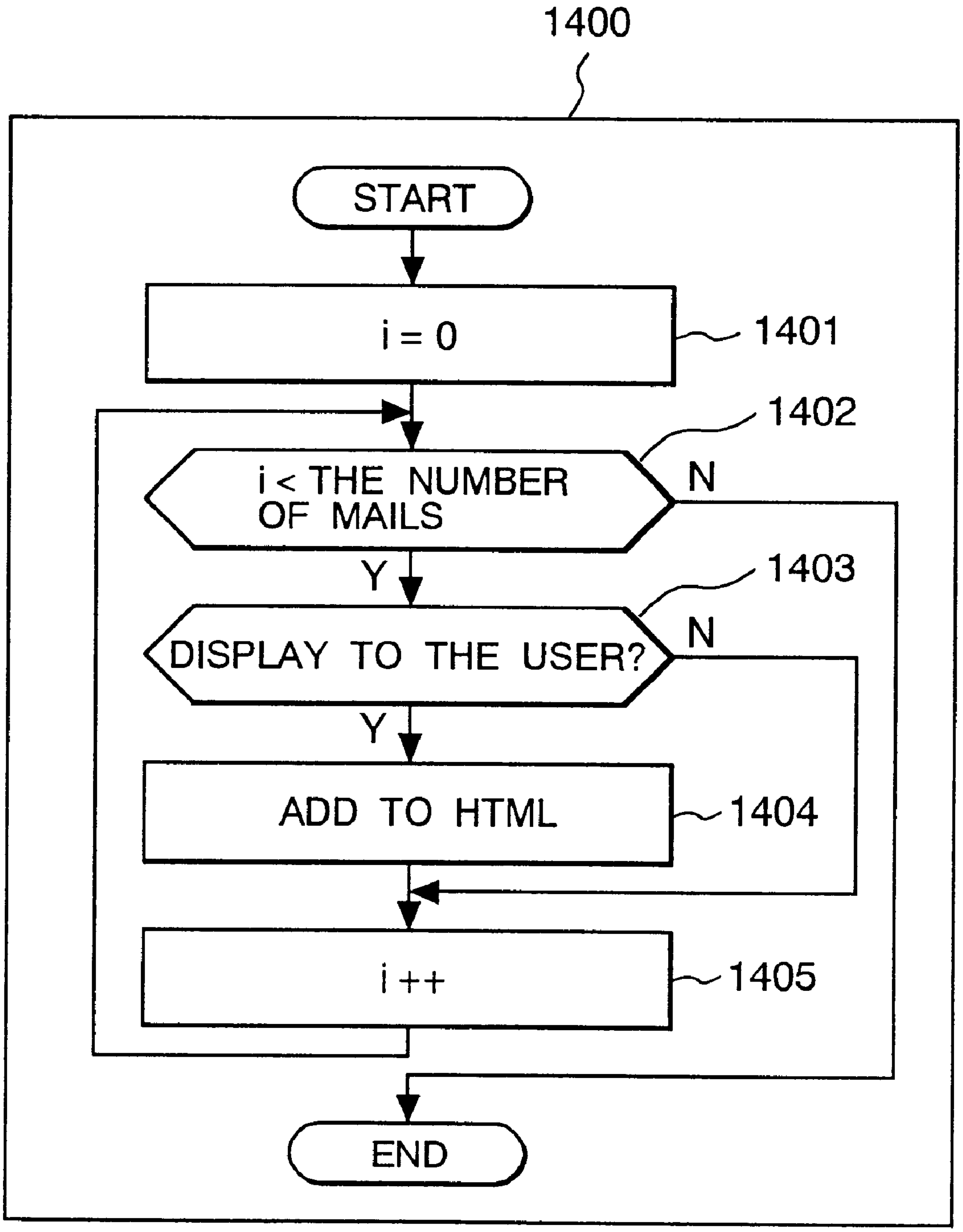
FIG. 14 is a flowchart for a received mail list acquiring process for acquiring a list of mails registered in the received mail registering process shown in FIG. 13.

A received mail list obtaining process 1400 for obtaining a list of mails registered in the received mail registering process 1300 will be described with reference to FIG. 14.

In the received mail list obtaining process 1400, a variable (i) is first set to 0 (step 1401). When (i) is smaller than the number of records registered in the mail management table 90 (FIG. 9) (step 1402), the processing routine advances to step 1403. If not, the process is finished.

The attribute 903 of an (i)th record 907*i* is checked in step 1403. When the attribute 903 is the attribute for displaying the mail list to the user, the transmitter 904, the date of transmission 905, and the title 906 of the record 907*i* are inserted into HTML data (data written with HTML) for displaying the mail list. In this instance, the <A> tag is used for the transmitter, date of transmission, and title so as to be linked. The destination of the link is the URL of the record 907*i* (step 1404). After completion of step 1404, the processing routine is returned to step 1402. When the attribute 903 is an attribute for not displaying to the user in step 1403, the processing routine is returned to step 1402.

An example of the HTML data formed in the above procedure is shown in FIG. 15.

Figure 16:
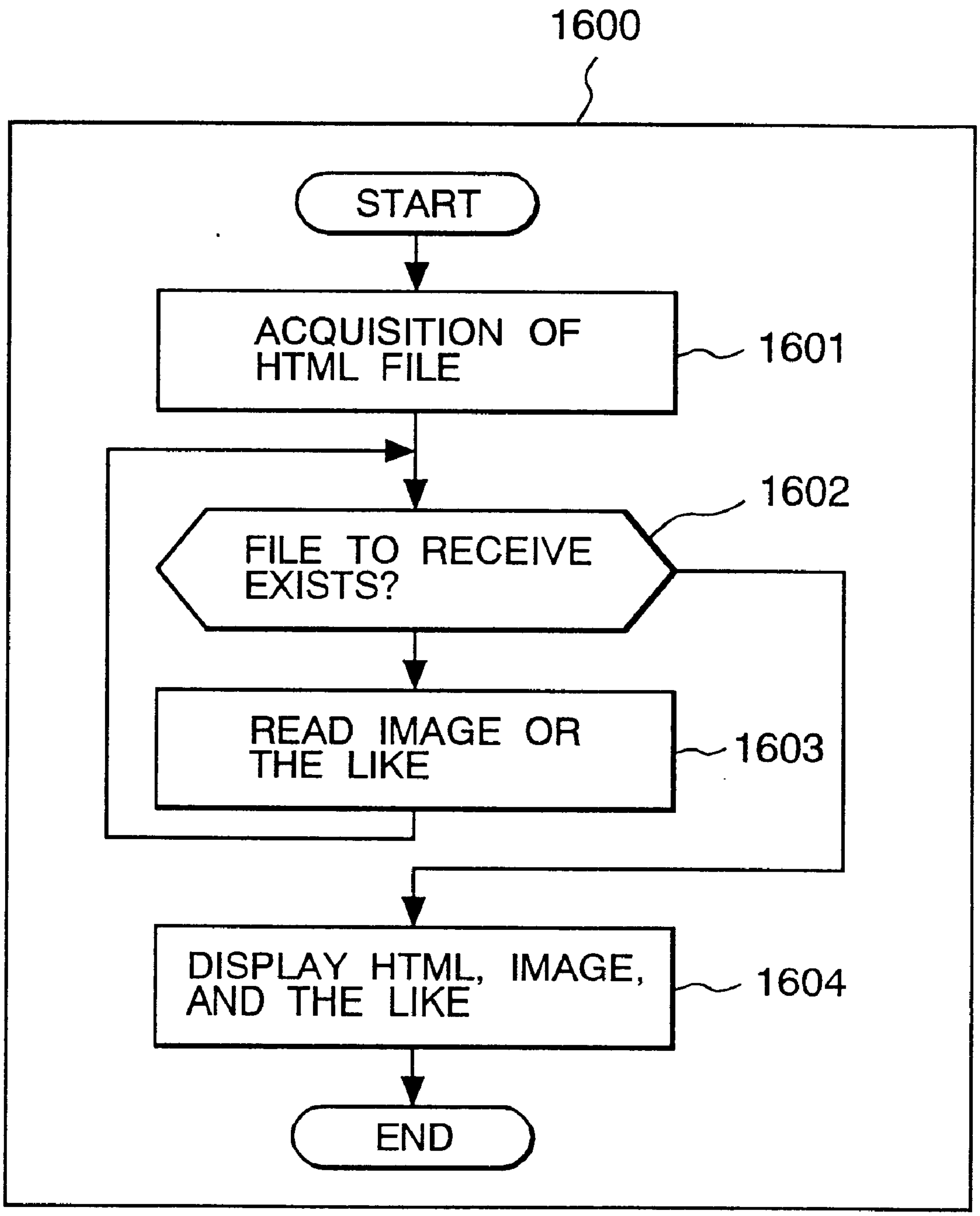
FIG. 16 is a flowchart for a screen displaying process in the terminal, for data obtained from a package medium, a network, and an electronic mail in FIG. 2.

Processes in the terminal 1 (FIG. 3) for mixedly displaying data obtained from the package medium 3, network (telephone line 5), and e-mail 6 on the screen will be described. A screen display process 1600 will be first described with reference to FIG. 16.

In the diagram, an HTML file (file written by using HTML) of the URL designated by the user or of the URL of the link destination designated by the user is obtained (step 1601). A check is made to see whether data such as an image to be taken is designated in the obtained HTML file or not (step 1602). As tags for designating taking-in of an image or the like, there are tags such as <IMG> and <EMBED> specified by HTML. When there is data to be taken, the data is read (step 1603). The data acquisition is repeated until there is no data to be taken.

When there is no data to be taken, the HTML file and the data taken on the basis of the designation of the HTML file are displayed (step 1604).

A data obtaining process 1700 will be performed for taking in the HTML file and data. The process 1700 will be described with reference to FIG. 17.

In the diagram, it is searched whether there is a record having the same URL 501 as the designated URL in the cache management table 500 (FIG. 5) or not (step 1701). In the case where there is the record, a file specified by the file name 502 of the searched record is read out from the cache (step 1705).

When there is no designated URL in the cache management table 50, it is searched whether a record in which the information ID 601 is included in the designated URL exists or not in the disk management table 60 (FIG. 6) (step 1702). When the record exists in the disk management table 60, a part which coincides with the information ID 601 of the searched record is deleted from the URL and a file obtained by connecting the directory 602 and the deleted part is accessed (step 1706).

For example, the designated URL is "//www.sv/ID00001/test.htm1" and a record in which the information ID 601 is "//www.sv/ID00001" and the directory 602 is "IDD0001" exists in the disk management table 60, "IDD0001/test.htm1" existing on the package medium 3 (FIG. 2) is accessed.

When the record does not exist in the disk management table 60, a process selection dialog for allowing the user to select insertion of another package medium 3, reading of the data from a network, or cancellation of the process (step 1703).

Figure 18A:
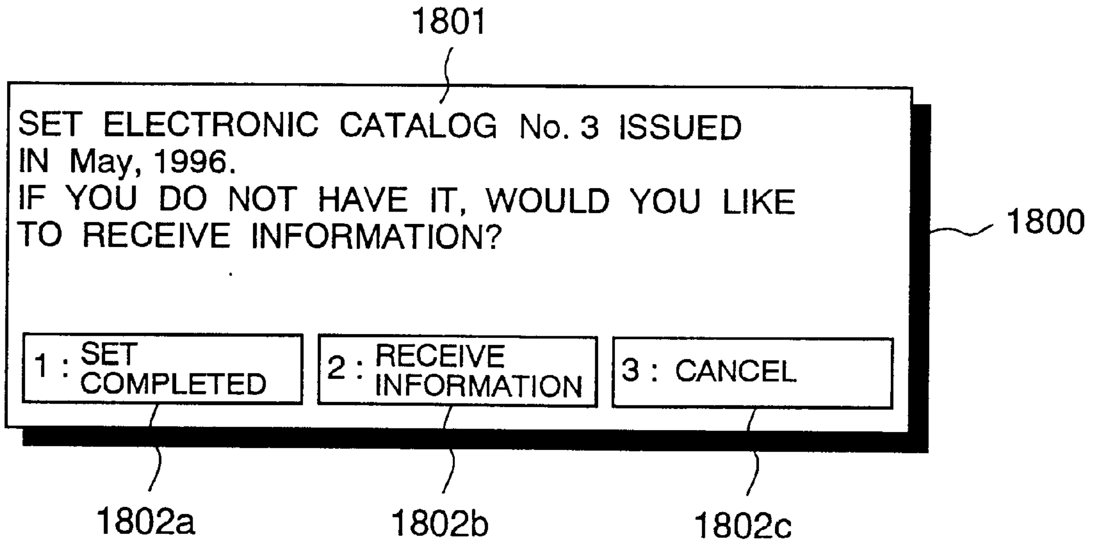
FIG. 18*a* and 18*b* are diagrams showing a display example of a process selection dialog by step 1703 in FIG. 17.
Figure 18B:
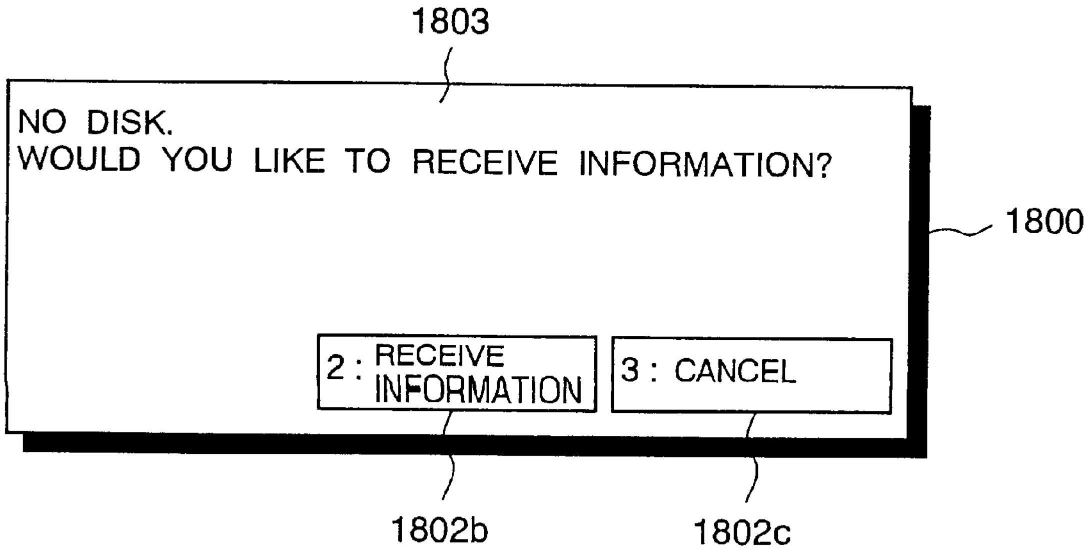

Examples of a process selection dialog 1800 displayed in step 1703 are shown in FIGS. 18*a* and 18*b*. In the process selection dialog 1800, as shown in FIG. 18*a*, there are a message 1801 specifying a package medium the user should insert, a button 1802*a* for notifying the completion of the set, a button 1802*b* for notifying that the data is received through the network, and a button 1802*c* for notifying cancellation of the process.

The message 1801 intends to search whether the record included in the URL to which the information ID 701 is designated exists or not in the disk link management table 70 (FIG. 7) existing in the storing unit 1*b* and the package medium 3 (FIG. 2). When the record exists, the disk information 702 of the searched record is read and displayed as a part of the message. When it is found by the search that the record does not exist, as shown in FIG. 18*b*, a message 1803 notifying that there is no disk is displayed instead of the message 1801 in the process selection dialog 1800.

Since the dialog is displayed, the user can know which package medium 3 to be inserted.

Figure 17:
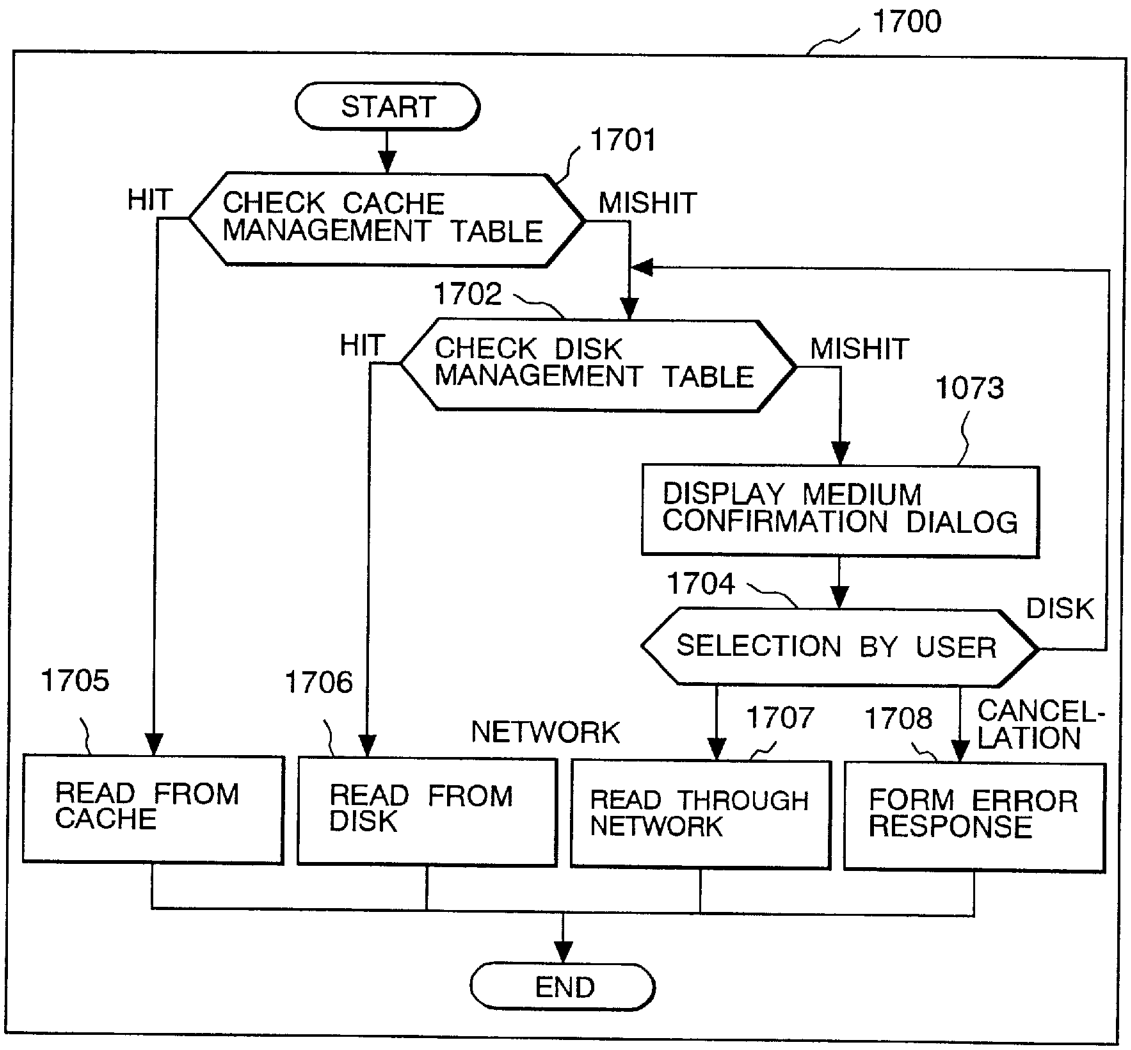
FIG. 17 is a flowchart for a data obtaining process for taking the HTML file and data in the terminal in FIG. 2.

When the button 1802*a* is selected in the process selection dialog 1800, the processing routine is returned to step 1702 in FIG. 17. When the button 1802*b* is selected, a communication process 1707 for reading out data from the network is executed. The communication process 1707 will be described later with reference to FIG. 19. When the user selects the button 1802*c*, an HTTP error response (error response specified by the HTTP (Hyper Text Transfer Protocol) as a communication protocol used in the internet) is formed (step 1708).

Figure 19:
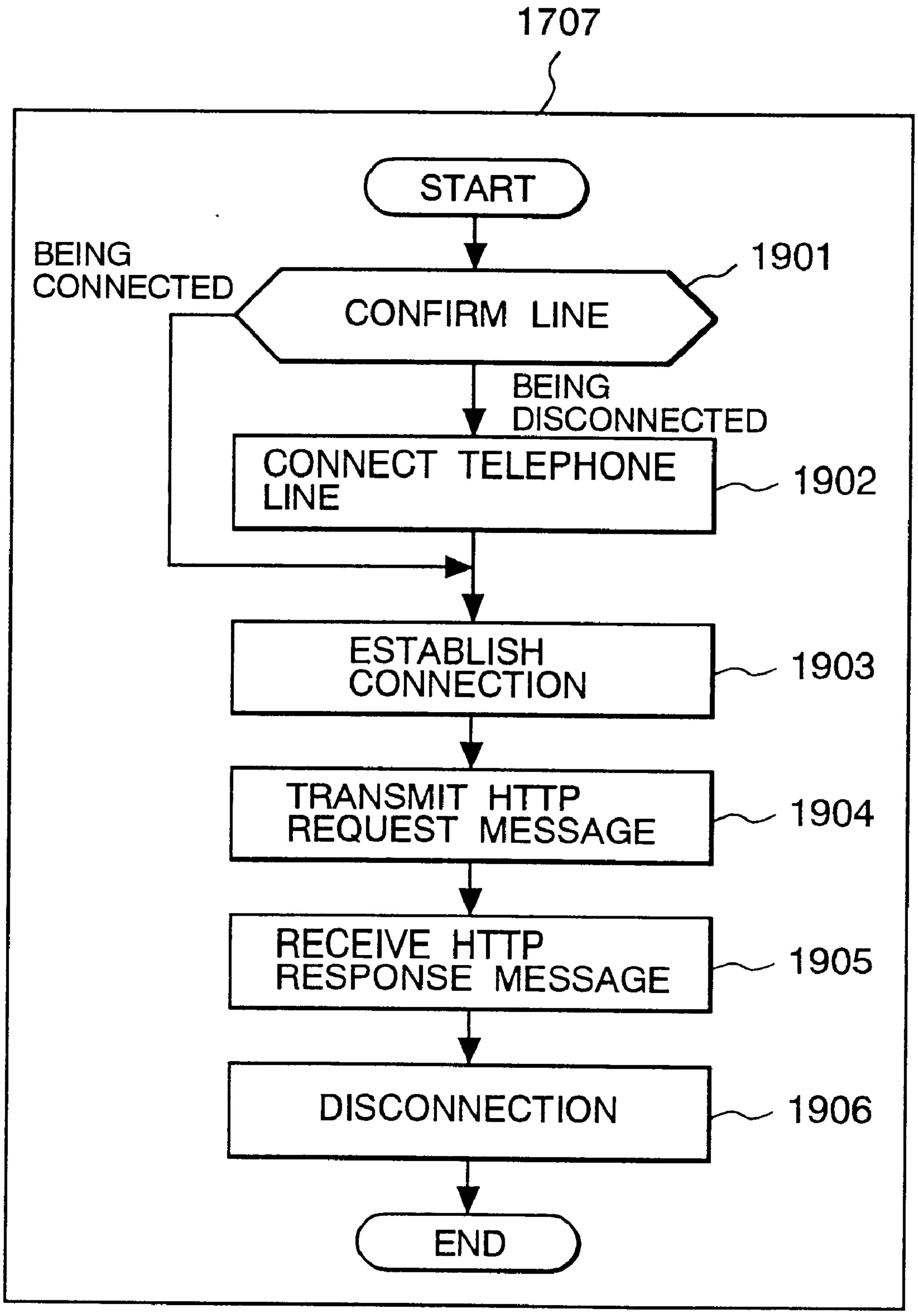
FIG. 19 is a flowchart showing the details of step 1707 in FIG. 17.

The communication process 1707 will be described with reference to FIG. 19.

In the diagram, a check is made to see whether the telephone line 5 (FIG. 2) is being connected or not (step 1901). When the telephone line 5 is being connected, the processing routine advances to step 1903. When the telephone line 5 is not connected, the telephone number 801 is read out from the server management table 80 (FIG. 8) and is dialed. After connection of the telephone line 5, the server 4 (FIG. 2) is logged in by using the user ID 802 and the password 803 of the server management table 80 (step 1902).

When it is discriminated that the telephone line 5 is connected as a result of the check in step 1901 or the telephone line 5 is connected in the process of step 1902, a TCP connection (connection using a TCP (Transport Control Protocol) as a communication protocol generally used in the internet) is established with a server designated by the URL. If the proxy 805 is designated in the server management table 80, the TCP connection is established with the server designated by the proxy 805 (step 1903).

Subsequently, an HTTP request message (request response specified by HTTP) for acquiring a file designated by URL is transmitted through the TCP connection (step 1904). An HTTP response message (request response specified by HTTP) is received through the TCP connection (step 1905). After receiving the HTTP response message, the TCP connection is disconnected (step 1906).

When the telephone line 5 is monitored and not used for a predetermined time (for example, 5 minutes), it is disconnected.

HTTP is described in detail in "Hyper Text Transfer Protocol—HTTP/1.0", INETNET-DRAFT, August, 1995.

By the above-mentioned processes, the information read from the network and the package medium can be mixedly displayed as shown in FIG. 1. When data does not exist in the package medium, the data can be read out through the network. Since the data 63*a* (FIG. 10) of the e-mail 6 which is not displayed to the user is also registered in the cache management table 50, the contents existing in the package medium 3 can be updated in appearance.

As mentioned above, according to the invention, the user can access the WWW server, the package medium, and the mail without noticing the difference of them and the data received form different media can be mixedly displayed on the same screen. For example, only text data of a small quantity is received from a low-speed network and data of a large quantity such as animation is read out from the package medium which can be accessed at high speed, thereby enabling an expressive screen to be displayed with a short communication time.

When there is no package medium storing desired data at hand, the data can be read from the network and displayed.

Since the package medium to be inserted to the terminal is notified to the user, there is an advantage such that the user can know which package medium to be used at a glance.

Further, since the mail is provided with the attribute to display or not to display, the contents of the package medium can be updated in appearance.

Figure 20:
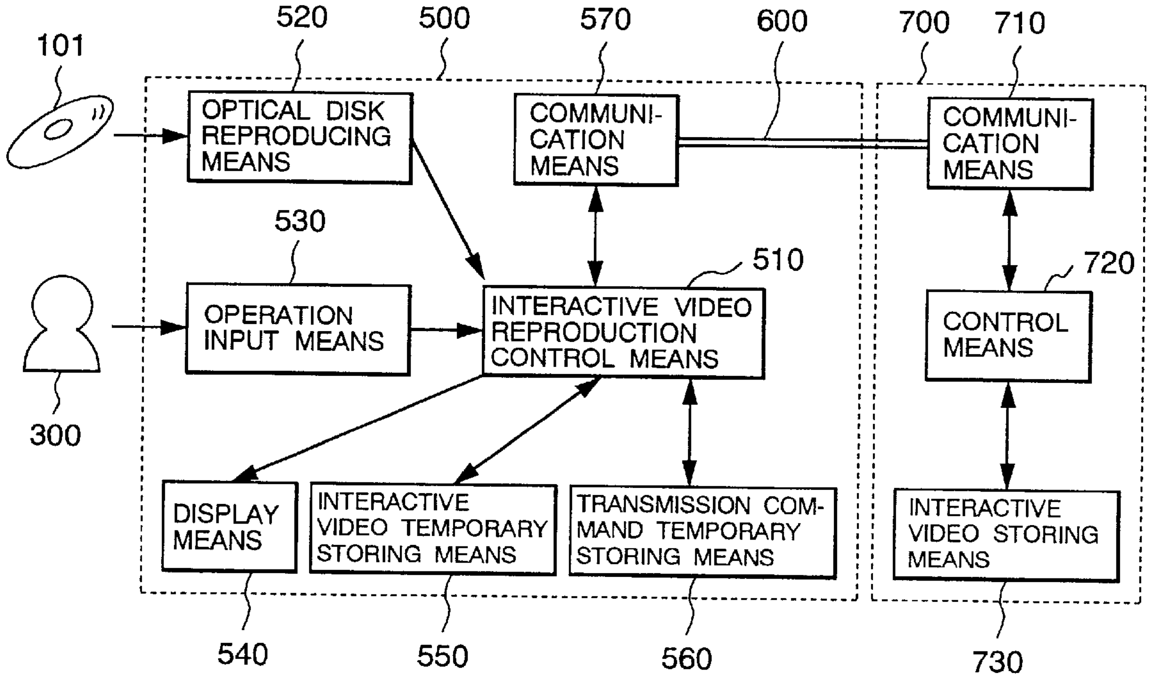
FIG. 20 is a diagram showing an example of a construction of an interactive video recording and reproducing system according to an embodiment of the invention.

FIG. 20 is an explanatory diagram showing an example of a configuration of an interactive video recording and reproducing system of the invention.

An interactive video reproducing apparatus 500 has an interactive video reproduction control means 510, an optical disk reproducing means 520, an operation input means 530, a display means 540, an interactive video temporary storing means 550, a transmission command temporary storing means 560, and a communication means 570.

The optical disk reproducing means 520 has a function of reproducing the optical disk 101 described with reference to FIG. 27. The operation input means 530 is a remote-control input means or a keyboard, which receives operating information instructed by a user 300 using a remote controller or the like and sends it to the interactive video reproduction control means 510.

As the display means 540, a display means such as a CRT display or a liquid crystal display is prepared.

The interactive video temporary storing means 550 is, for example, a cache memory having a high response which temporarily stores video data or the like sent from the interactive video reproduction control means 510 and generates the video data in accordance with an instruction from the interactive video reproduction control means 510.

The transmission command temporary storing means 560 has a function of temporarily storing a command to be sent via the communication means 570 to a communication medium 600 side by the interactive video reproducing apparatus 500.

A network server 700 to which the interactive video reproducing apparatus 500 is connected via the communication medium 600 such as a telephone line or the like has a communication means 710, a control means 720, and an interactive video storing means 730 and transmits video data to the interactive video reproducing apparatus 500 side.

Figure 21:
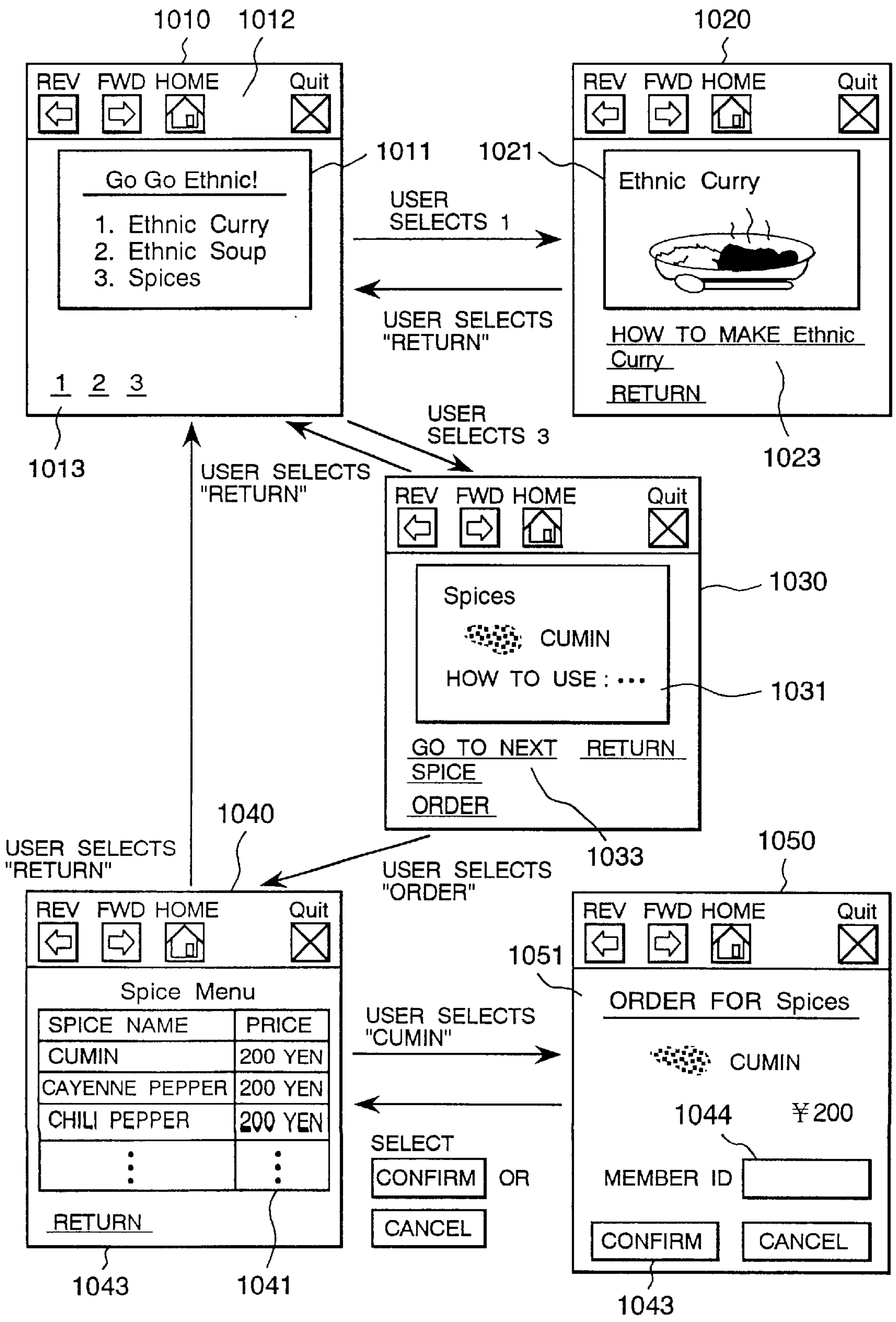
FIG. 21 is a diagram showing an example of a construction of the interactive video recording and reproducing system according to the embodiment of the invention.

FIG. 21 is a view illustrating a reproducing procedure in the interactive video reproducing apparatus 500. In the diagram, information regarding ethnic food is provided and processes for ordering food materials are shown.

A display screen 1010 shows a state where a file /WWW/HTML/INDEX.HTM in the HTML format in the optical disk medium 101 is reproduced. The display screen is constructed by a region 1012 in which functional buttons for easily operating a history of pages of the WWW browser (REV button for returning to the previous page, FWD button for advancing to the next page, HOME button for returning to the first page, and QUIT button for finishing the execution of the WWW browser) are displayed and a region 1011 in which HTML data is displayed.

FIG. 22 shows the contents of description of UNDEX.HTM. The description is according to the HTML standard.

In a line 2001, an extension function of HTML called a "metafunction" is described.

The description is in a tag starting with "META". HTTP-EQIV="Cashe" defines a process of data in a cache memory serving as the interactive video temporary storing means 550 in the interactive video recording and reproducing apparatus 500.

CONTENT="Expire" describes an instruction to erase data in the cache memory. In case of keeping the data, describe as CONTENT="Keep".

In a line 2002, contents to control a timing to transmit a command from the interactive video recording and reproducing apparatus 500 to the network 700 side by using the metafunction as an extension function of HTML are described.

HTTP-EQIV="SENDCONTROL" defines a command transmitting control.

CONTENT="SendAll" stands for an instruction to send all of commands in a lump which are stored in the transmission command temporary storing means 560 in the interactive video recording and reproducing apparatus 500.

In case of temporarily storing the transmission commands which are instructed this time, describe as CONTENT="Reserve".

A line 2003 indicates a control of connection to the communication medium 600 by using the metafunction.

HTTP-EQIV="Connect" defines a connection to the communication medium.

CONTENT="off" instructs that the communication means 570 in the interactive video recording and reproducing apparatus 500 is disconnected from the communication medium 600.

In case of continuing the connection to the communication medium 600, describe as CONTENT="on".

A line 2004 describes a display of image data.

In case of displaying the image data, a file name is designated in a portion ". . . " of <IMG SRC=" . . . ">. In case of moving to another page when the image is selected by the user, <IMG SRC=" . . . "> is sandwitched by <A HREF=" . . . "> and </A> shown in a line 2005 and a page name to be moved to is designated in a portion of ". . . " of <A HREF=". . . ">. A storing location of the file is described by partitioning a directory name by using a slash (/). When the root directory is not described, it is written by relatively referring to from a directory in which the HTML file is stored.

In FIG. 22, it is described that when the INDEX.HTM file is opened, an image file of ". . ./GIF/MENU001.GIF" is displayed. In this case, the directory is relatively referred to. By using a recording location of /WWW/HTML of INDEX.HTM as a reference, reference is moved to a next upper directory /WWW and /WWW/GIF/MENU001.GIF is displayed. A display performed in this manner is the still image 1011 in the screen 1010 in FIG. 21. Further, in the display screen 1010, following the display of MENU001.GIF, characters 1013 which are allocated numbers "1", "2", and "3" are displayed in order to accept a selecting operation of the user.

When the user selects "1" of the selection buttons 1013 in the display screen 1010, the display is moved to a PAGE001.HTM file as a corresponding page. The contents of the PAGE001.HTM file are as shown in FIG. 23. In this file as well, the cache memory is controlled in the line 2101 and the connection to the communication medium is controlled in the line 2102. A file name of image data which is displayed first is VIDEO001.GIF.

It is defined to subsequently display characters as character information such as "how to make ethnic curry". It is also defined to display a selection button lastly, which is linked to the INDEX.HTM file ("return" is allocated in the diagram). When the WWW browser opens the file PAGE001.HTM in the HTML format, a display as shown in a display screen 1020 is obtained.

On the other hand, when the user selects "3" of the selection buttons in the display screen 1010, the display is moved to a PAGE003.HTM file as a corresponding page.

FIG. 24 shows the contents of PAGE003.HTM.

In the file as well, the cache memory is controlled in the line 2201 and the connection to the communication medium is controlled in the line 2202.

In this page, an image 1031 of MENU002.GIF as image data and character information 1033 are displayed.

When the user selects "go to the next spice" (1033), a spicelst.HTM page is accessed and displayed.

FIG. 25 shows the contents of a file of spicelst.HTM. The file relates to a menu showing the kinds of spices and a line 2201 describes an instruction to keep the contents of the cache memory.

On a screen 1040 in FIG. 21, an image 1041 showing names of various spices and prices and character information 1043 of "return" are displayed.

When the user selects cumin as a kind of spices on the screen 1040, the display is moved to a file of "order1.htm" described in the line 2202 of FIG. 25.

Figures 26, 27:
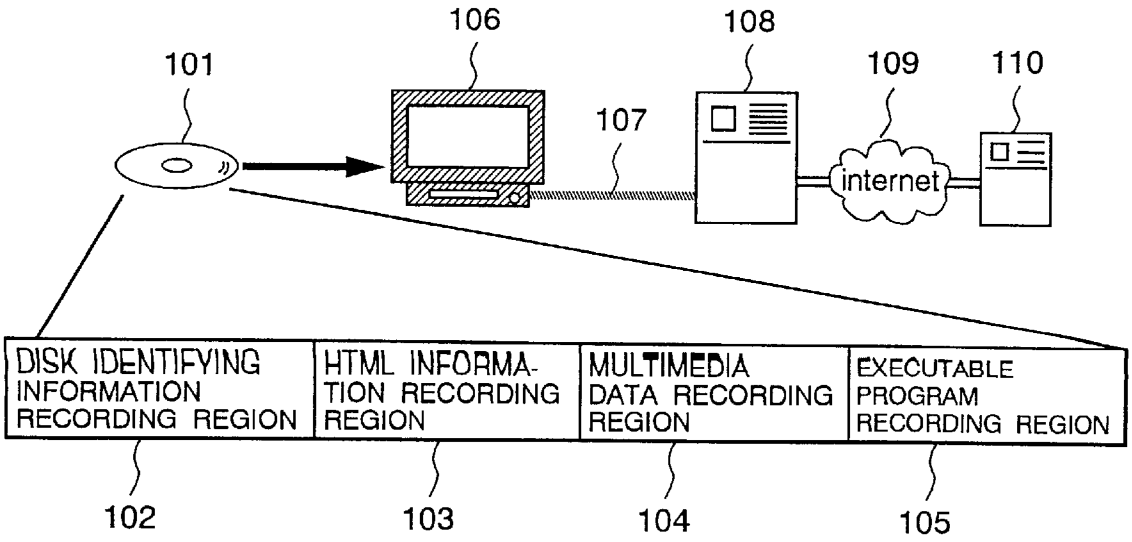
FIG. 26 is a diagram showing the contents of an order1.htm file.
FIG. 27 is a diagram showing an example of a construction of an interactive video recording and reproducing system.

FIG. 26 shows the contents of the file of "order1.htm".

As for the contents displayed first, characters of "order for spices" sandwiched by <U> and </U> are displayed with an underline, and subsequently, an image file of SPICE1.GIF and characters of "cumin" are displayed by the description of a line 2401. In a line 2402, it is declared that an HTML form inputting function is used. It denotes that when the user selects <INPUT TYPE="submit" . . . > described in a line 2404, the WWW browser delivers the form inputting contents to a program of post-query of WWW.ethnic.XXX.XXX as a WWW server.

In the form inputting contents, a text field <INPUT TYPE="text" . . . > for inputting a member ID is defined in a line 2403 and the WWW browser displays a text input field. When WWW browser opens the file of order1.htm in the HTML format, a display as shown in a display screen 1050 is obtained. When the user inputs the member ID in the text input field and selects a confirmation button 1043, the WWW server confirms the received member ID, executes a process for accepting the order, and sends back the same HTML information as PAGE003.HTM as a page to be displayed next. Consequently, the WWW browser displays the display screen 1030 again.

Although it is defined by the description of the line 2401 to display the image file of SPICE1.GIF in the embodiment, the image file can be also transmitted from the WWW server side, or the file of SPICE1.GIF which is preliminarily recorded in the same directory hierarchy in the interactive video recording medium 1011 can be also used.

Generally, when such an image file is used, the WWW browser obtains the image file by using the recording location of the file in the HTML format which is being displayed as a reference. In the embodiment, since the file in the HTML format of order1.htm is acquired from the WWW server of www.ethnic.xxx.xxx, SPICEI1.GIF is also obtained from the WWW server.

Figure 28:
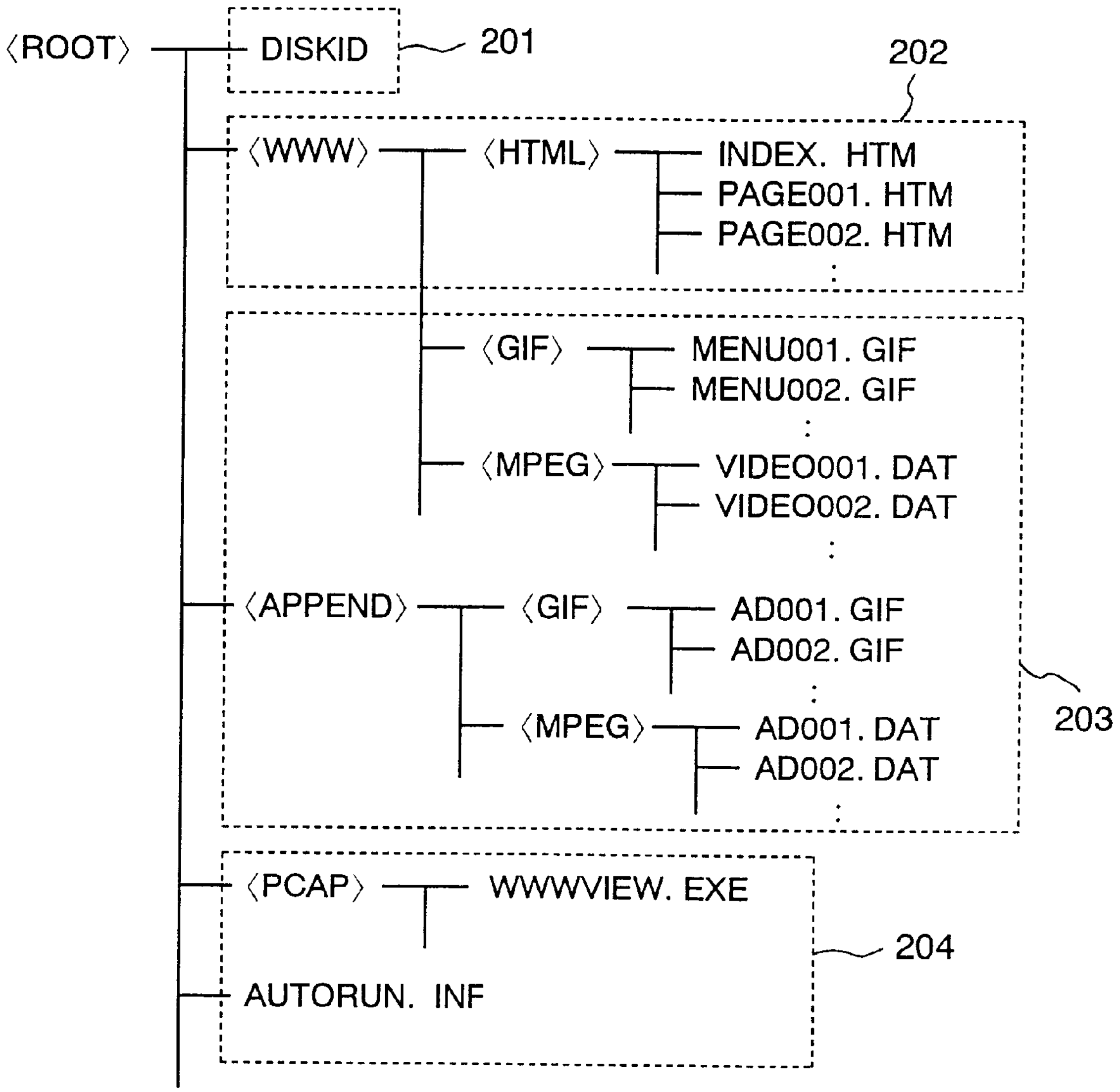
FIG. 28 is a diagram showing an example of a directory structure in an optical disk medium.
Figure 29:
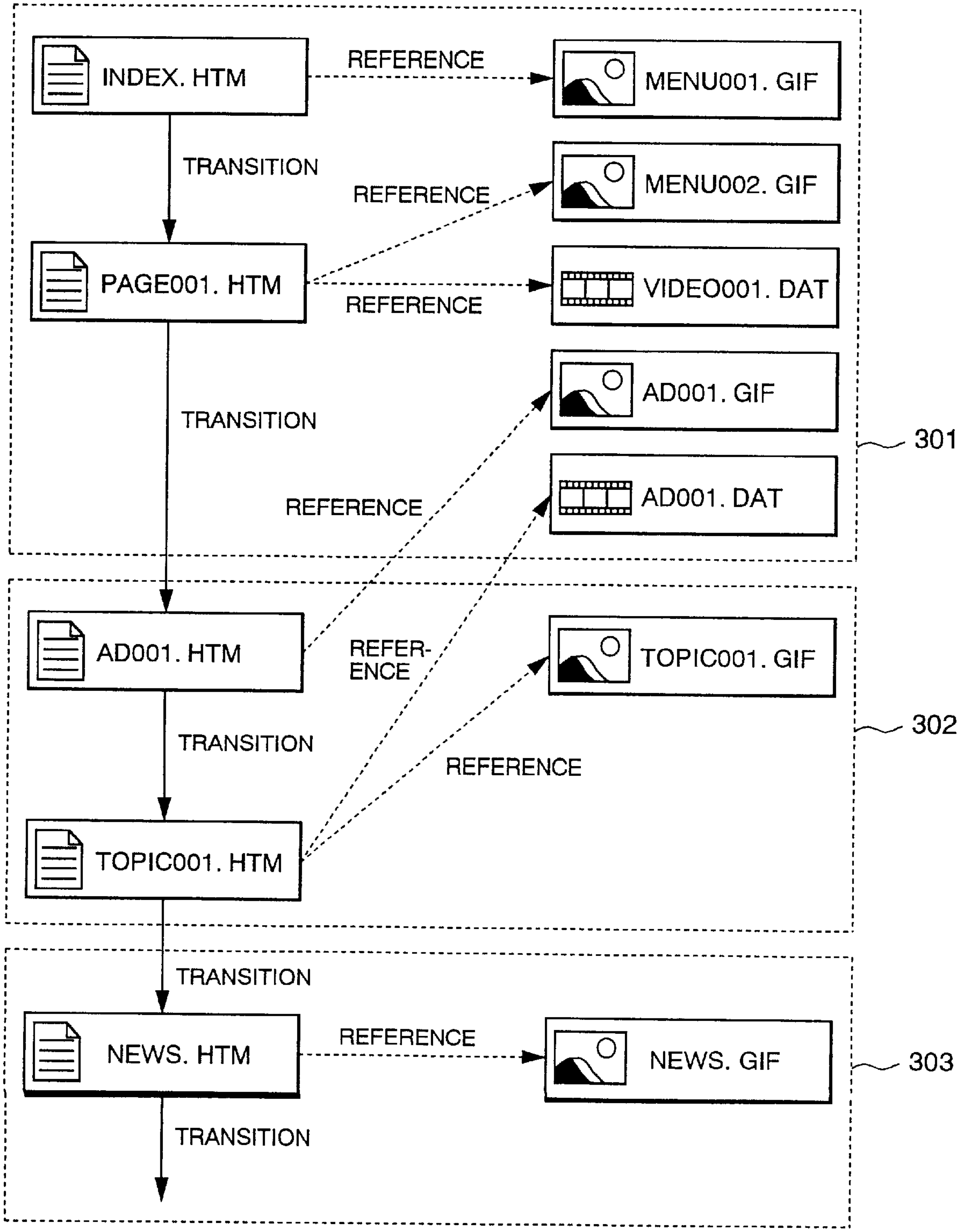
FIG. 29 is a diagram showing association of multimedia data.

Consequently, in order to display SPICE1.GIF preliminarily recorded in the interactive video recording medium 1011, it is sufficient to use the WWW browser having a function of searching whether the same file exists in the interactive video recording medium 1011 before obtaining the image file from the WWW server. It is sufficient to use the WWW browser having such a function, which is recorded under the name of, for example, WWWVIEW.EXE in the PC information recording region 204 in FIG. 28. When the WWW browser has a function of directly displaying a file in the video CD information recording region (a file in <VIDEO><MENU>), it is unnecessary to record the image file of the same pattern in the <WWW>–<GIF> directory, so that the recording efficiency of the medium is improved.

As mentioned above, according to the interactive recording and reproducing system of the invention, since the corresponding reproducing procedure is obtained from the video reproduction control data for the operation input of the user and the video data is reproduced according to the obtained reproducing procedure, the interactive reproduction can be performed.

Since the video data supplied from the package medium is reproduced, the reproduction is faster than a case of reproducing video data supplied via a network and the connecting costs can be also saved.

By introducing the connection to the internet server from the package medium as a starting point, various services such as information providing service and fare discount service can be provided to the package medium holder.

Since the HTML description includes a description to select whether data is to be stored in the interactive video temporary storing means or to be deleted, the temporary storing means can be effectively used. By including the descriptions regarding the connection to a network and the control of the transmission command, the interactive video recording and reproducing system which is more easily used can be obtained.

Method and apparatus for displaying link information according to an embodiment of the invention will be described hereinbelow with reference to FIGS. 30 to 35.

Figure 30:
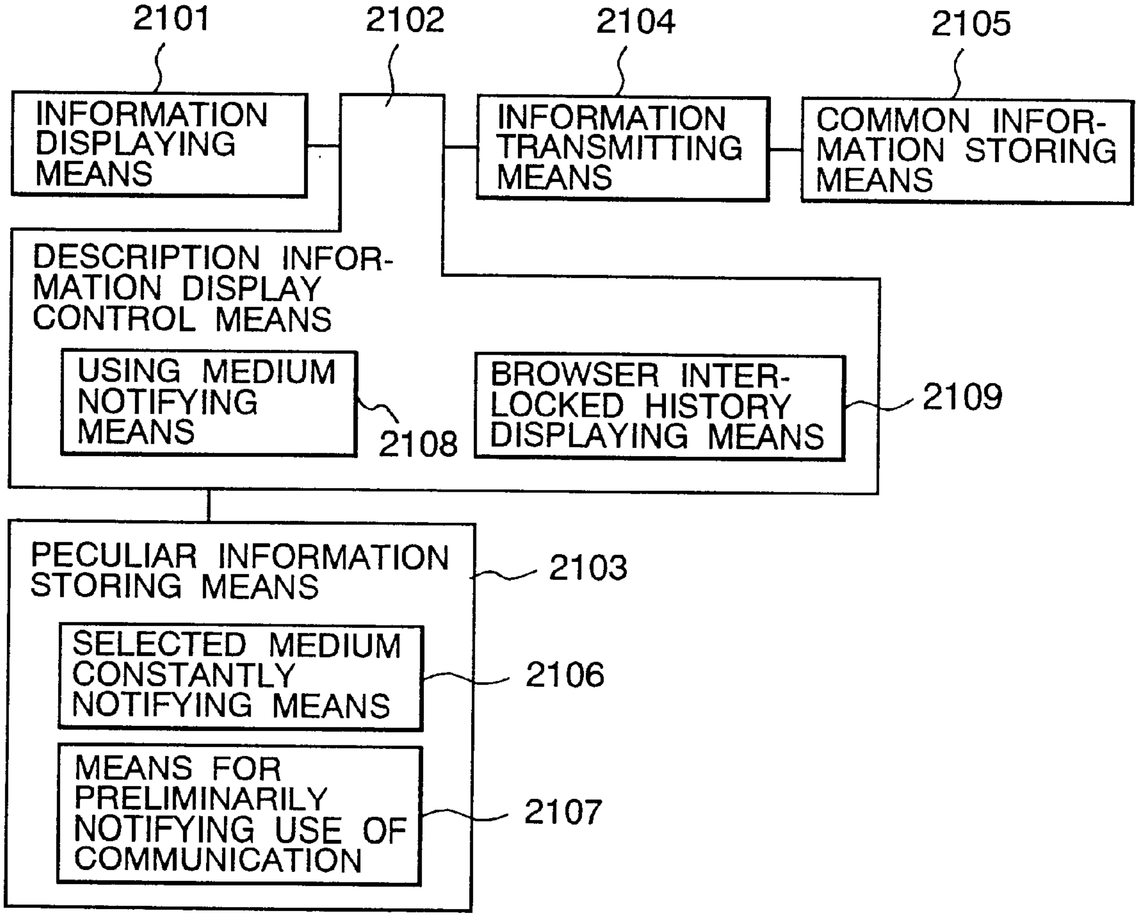
FIG. 30 is a block diagram showing a construction of a link information display according to the invention.

FIG. 30 is a block diagram showing a construction of an apparatus for linking display information according to the invention. In FIG. 30, an information display means 2101 is a display in a personal computer or the like. A description information display control means 2102 is software such as the WWW browser installed in a personal computer. A peculiar information storing means 2103 is a CD-ROM or the like. An information transmitting means 2104 is constructed by, for instance, a modem, a communication line, and a communication protocol. A common information storing means 2105 is a group of WWW servers or the like. A selection medium constantly notifying means 106 is constructed by, for example, page information stored in the peculiar information storing means (CD-ROM) 2103 in order to display a name of information which can be selected and an image expressing an information storing medium (means) to which the information belongs and a display control function of the software in the description information display control means 2102 for displaying the page information. A means 2107 for preliminarily notifying of use of communication is constructed by, for example, page information stored in the peculiar information storing means (CD-ROM) 2103 for a display asking the user whether a communication medium is used or not and a display control function of software in the description information display control means 2102 for displaying the page information. A means 2108 for notifying a medium to be used has means for always displaying an icon and a cursor image expressing an information storing medium to which information being displayed or to be displayed next belongs and has a display control function realized by the software in the description information display control means 2102. A browser-interlocked history display means 2109 has, for example, a display control function realized by software for retaining transition history information of the displayed information interlockingly with information displayed by the WWW browser and displaying the transition history information in a tree structure.

The information display means 2101, description information display control means 2102, and peculiar information storing means 2103 are constructed by a personal computer in which software such as the WWW browser or the like is installed and a CD-ROM drive is provided. The common information storing means 2105 is constructed by a group of hard disks and means for controlling the group of hard disks. The information transmitting means 2104 is constructed by a modem, a communication line, and the like connecting the personal computer and the common information storing means 2105.

Hitherto, each of the peculiar information storing means 2103 and the common information storing means 2105 is independently used by the description information display control means 2102. However, there are problems such that information becomes old in the peculiar information storing means 103 with the elapse of time and it takes time and costs for using the common information storing means 2105. In order to make use of advantages and compensate disadvantages of both of the storing means, a link device (link system) for linking and displaying information of both of the storing means showed up.

In a present link system, each of the peculiar information storing means 2103 and the common information storing means 2105 has a peculiar information describing method. Since many of the link systems use an existing personal computer communication and it is necessary to newly form contents according to each describing system, a burden is huge.

According to the invention, therefore, information of the CD-ROM as the peculiar information storing means 2103 is described in the HTML format which is commonly used in describing information in the WWW server as the common information storing means 2105. Images, audio data, texts, and link information as information associating the data are stored in each storing means and the WWW browser in the description information display control means 2102 is used, thereby constructing a link system in which the CD-ROM as the peculiar information storing means 2103 is used as a virtual WWW server.

Figure 31:
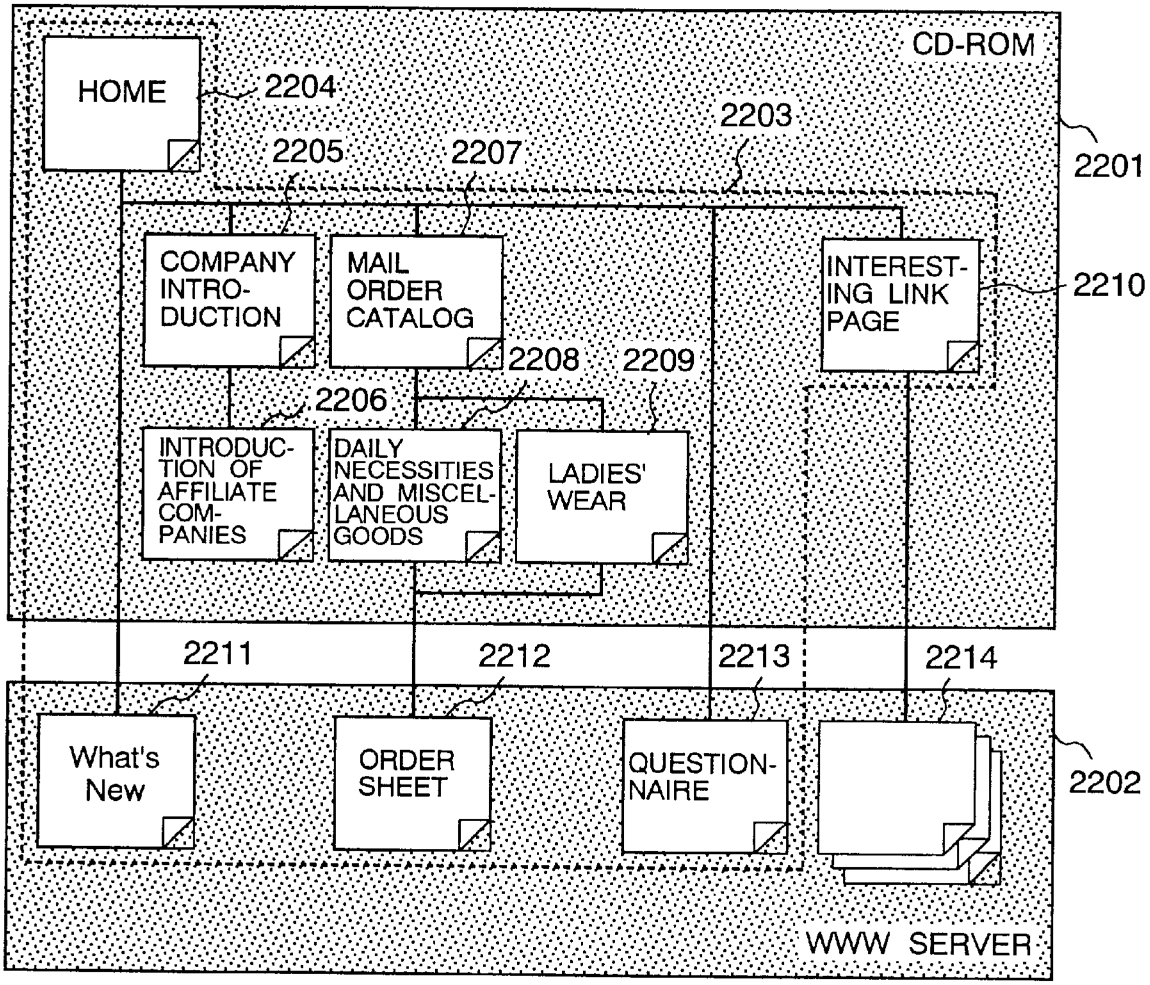
FIG. 31 is a block diagram showing a construction of information in the link information display according to the invention.

FIG. 31 is a block diagram showing allocation of information of a home page of a company, which includes information of the CD-ROM (peculiar information storing means) 2103 serving as a virtual WWW server and that of the actual WWW server (common information storing means) 2105. FIG. 31 includes: a group 2201 of page information existing on the CD-ROM 2103; a group 2202 of page information existing on the WWW server 2105; a group 2203 of page information of the link system; respective page information 2204 to 2213 of the group of page information of the link system; and a group 2214 of page information which is not of the link system but is linked from the CD-ROM 2103.

In the link system using the common description, information page unchanged for a predetermined period of time, for example, the company introducing information 2205, 2206, catalog information 2207, 2208, 2209 for mail order, and the collection 2210 of URLs, and information such as moving images and audio data which takes time to ordinarily access the internet is preliminarily stored in the CD-ROM 2103. The new arrival information 2211 which is frequently updated, the order sheet information 2212 such as data registration and application requiring a use of a communication medium, the questionnaire 2213, and the like are stored in the WWW server 2105, thereby improving the efficiency. Not only the page information on the WWW server 2105 which is linked with the CD-ROM 2103, the link to the group 2214 of page information on another WWW server is also realized.

The selected media constantly notifying means 2106 and the means 2107 preliminarily notifying the use of communication in FIG. 1 will be described.

Figure 32:
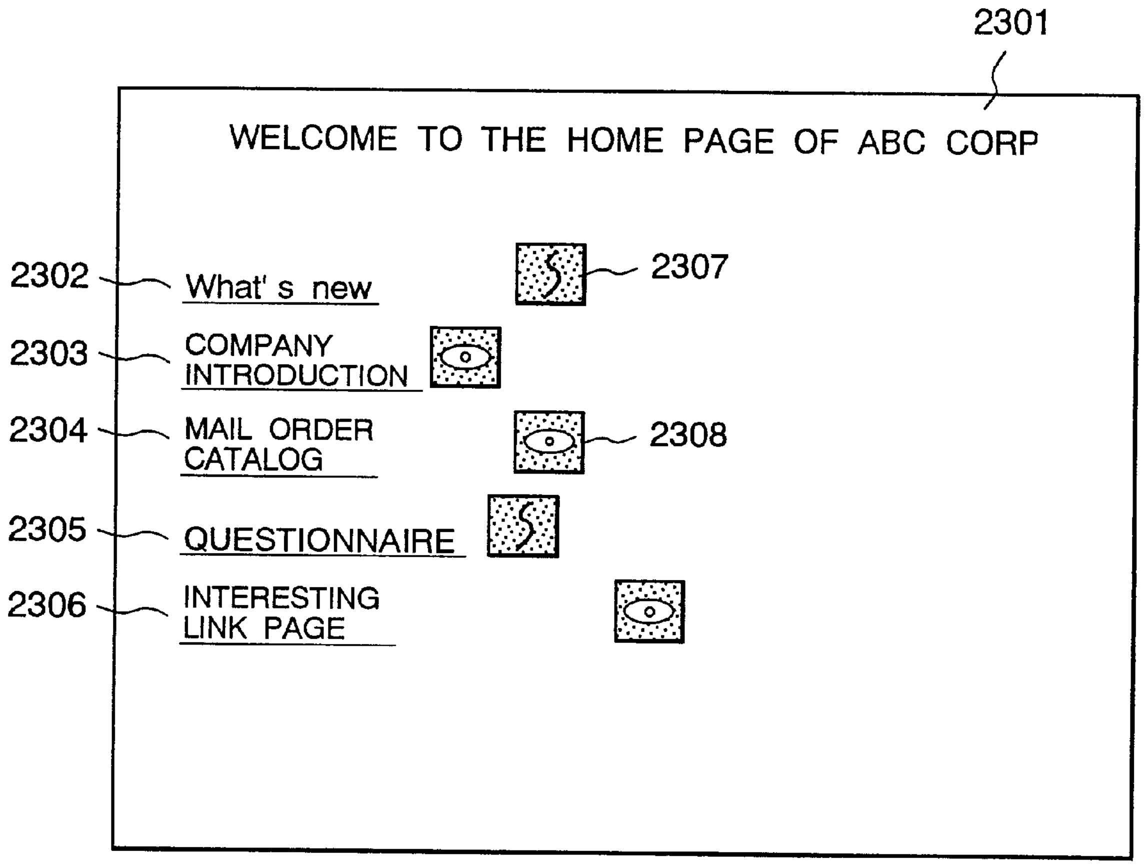
FIG. 32 is a display screen of page information constantly notifying a selected medium in the link information display according to the invention.

FIG. 32 shows a display screen in which the selected media is constantly notified by the selected medium constantly notifying means 2106 according to the invention by using the page construction shown in FIG. 31 as an example. In FIG. 32, reference numeral 2301 indicates a display screen of a home page of a company; 2302 to 2306 options of the link page information; 2307 a communication icon image showing that the link page information is obtained from the WWW server 2105 through the communication medium; and 2308 a CD-ROM icon image showing that the link page information is obtained from the CD-ROM 2103.

Figure 33:
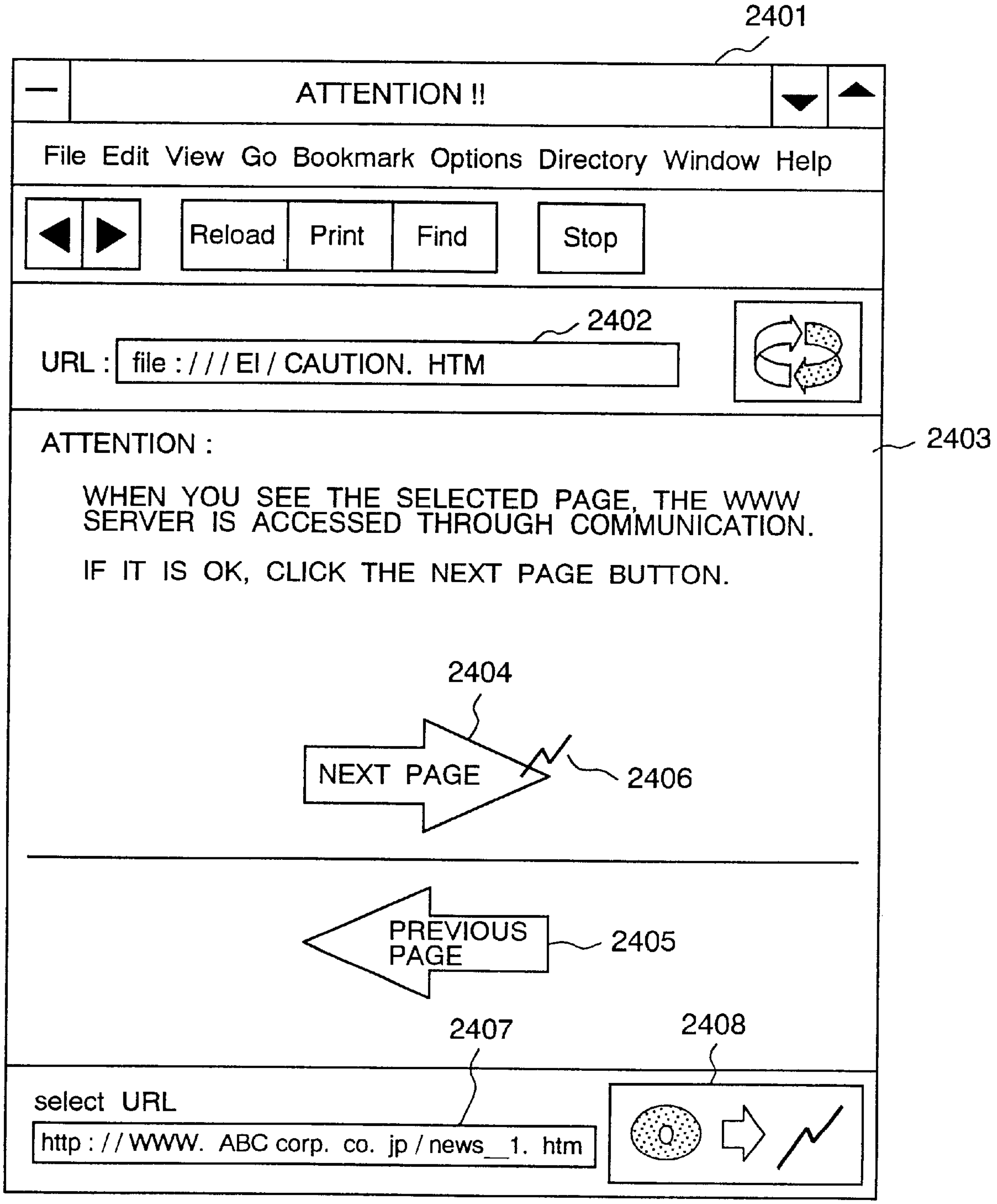
FIG. 33 is a display screen of page information preliminarily notifying use of communication in the link information display according to the invention.

FIG. 33 shows a display screen in which communication start notifying page information is displayed by the means 2107 preliminarily notifying the use of communication according to the invention. Reference numeral 2401 denotes a WWW browser; 2402 a present page information address display column; 2403 a communication start notifying page; 2404 a next page link key (on the WWW server); 2405 a previous page link key; 2406 a cursor; 2407 a display column of an address of page information to be selected; and 2408 a using medium notifying column. The cursor 2406 and the use medium notifying column 2408 are used to describe the use medium notifying means 2108.

Hitherto, it is always necessary to use the communication medium (line) to access the internet. According to the link system using the common description, however, access to the page information on the CD-ROM 2103 is like access to a virtual WWW server and the information can be used without using the communication line. The present WWW browser displays a description starting with "file:///~" in the present information address display column 2402. When the cursor is moved to indicate an option in the page layout, a description starting with "file:///~" is displayed in the display column 2407 of information to be selected if the option is page information in the CD-ROM 2103 and a description starting with "http://~" is displayed if the option is page information on the WWW server 2105, thereby notifying the user of the medium of the selected page information. However, since the description appears in the character format in the lower part of the display screen, it is difficult for the user, especially a beginner who does not understand the contents, to recognize the description. When the page information on the WWW server 2105 is selected without confirming the description, the user is connected to the WWW server 2105 via the communication line without noticing it.

FIG. 32 shows an example of home page information of a company. In the selection medium constantly notifying means 2106, it is described that options 2302 to 2306 of page information to be linked and the icon images 2307 and 2308 expressing the information storing media (information storing means) to which the page information belongs are displayed. For example, in the description of the company home page display screen 2301, since the catalog page 2304 for mail order is information belonging to the CD-ROM 2103, the CD-ROM icon image 2308 is displayed. Since the questionnaire page 2305 is information belonging to the WWW server 2105, the communication icon image 2307 is displayed. By displaying the communication icon image 2307 and the CD-ROM icon image 2308, the visual information by which the user can certainly recognize the information storing medium to which the information of each option belongs can be always showed by editing the text information.

The display screen of FIG. 33 is a notifying page displayed when the information belonging to the WWW server 2105 is selected from the display of the information belonging to the CD-ROM 2103, that is, when the display of the information of the CD-ROM 2103 is linked and moved to the display of the information of the WWW server 2105 via the communication line. The means 2107 preliminarily notifying the use of communication displays the communication start notifying page 2403 prepared on the CD-ROM 2103. In the case where the user understands the message and clicks the next page link key 2404, access to the WWW server 2105 is permitted. When the communication is not established, by clicking the previous page link key 2405, the display is returned to the previous page on the CD-ROM 2103. As mentioned above, by displaying the communication start notifying page 2403, recognition and permission of the user are always necessary to start the communication. That is, by editing the text information corresponding to the common description of the selection medium constantly notifying means 2106 and the means 2107 preliminarily notifying the use of communication, the medium to be used can be clearly showed to the user.

Figure 34:
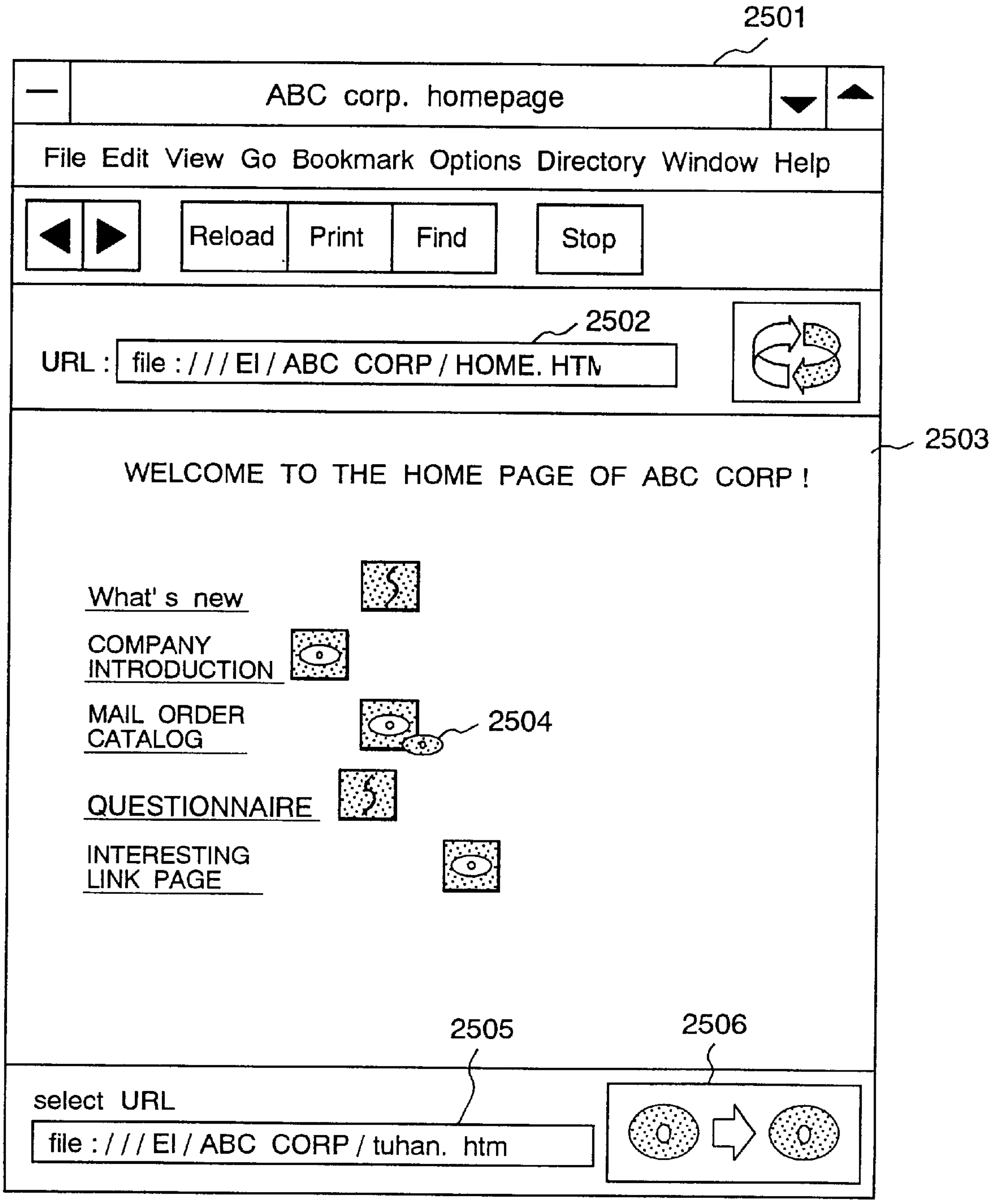
FIG. 34 is a display screen of used page information notifying a medium to be used in the link information display according to the invention.

The means 2108 notifying a medium to be used shown in FIG. 30 will be described. FIG. 34 shows a screen on which the using medium notifying cursor and icon images are displayed by the using medium notifying means 2108 according to the invention. A WWW browser 501, a display column 2502 of a current page information address, a home page column 2503, a cursor 2504, a display column 2505 of page information to be selected, and a using medium notifying column 2506 are displayed.

As mentioned above, according to the present WWW browser, the address of the page information being displayed is displayed in the current page information address column 2502. When the cursor is moved to indicate an option in the page layout, the address of the selected page information is displayed in the display column 2505 of the page information to be selected.

In association with the link system by using the common description according to the invention, in the link information display, for example, the ordinary cursor of an arrow is changed to the CD-ROM cursor 2504 when an option in the page layout is page information in the CD-ROM 2103. The cursor is changed to the communication cursor 2406 when the option is page information on the WWW server 2105.

Interlockingly with the cursor, the information storing medium to which the current display page belongs and the information storing medium to which the selected page information belongs are displayed in the using medium notifying columns 2408 and 2506. For example, an icon of the CD-ROM image indicating that the page information being displayed by the WWW browser belongs to the CD-ROM 2103 is displayed on the left region of the use medium notifying column 2408.

An icon of a communication image indicating that the next page link key 2404 being selected by the cursor 2406 denotes the link to the page information belonging to the WWW server 2105 is displayed on the right region of the using medium notifying column 2408. By the using medium notifying columns 2408 and 2506, the information storing medium to be used can be always showed to the user as a function of the WWW browser.

Figure 35:
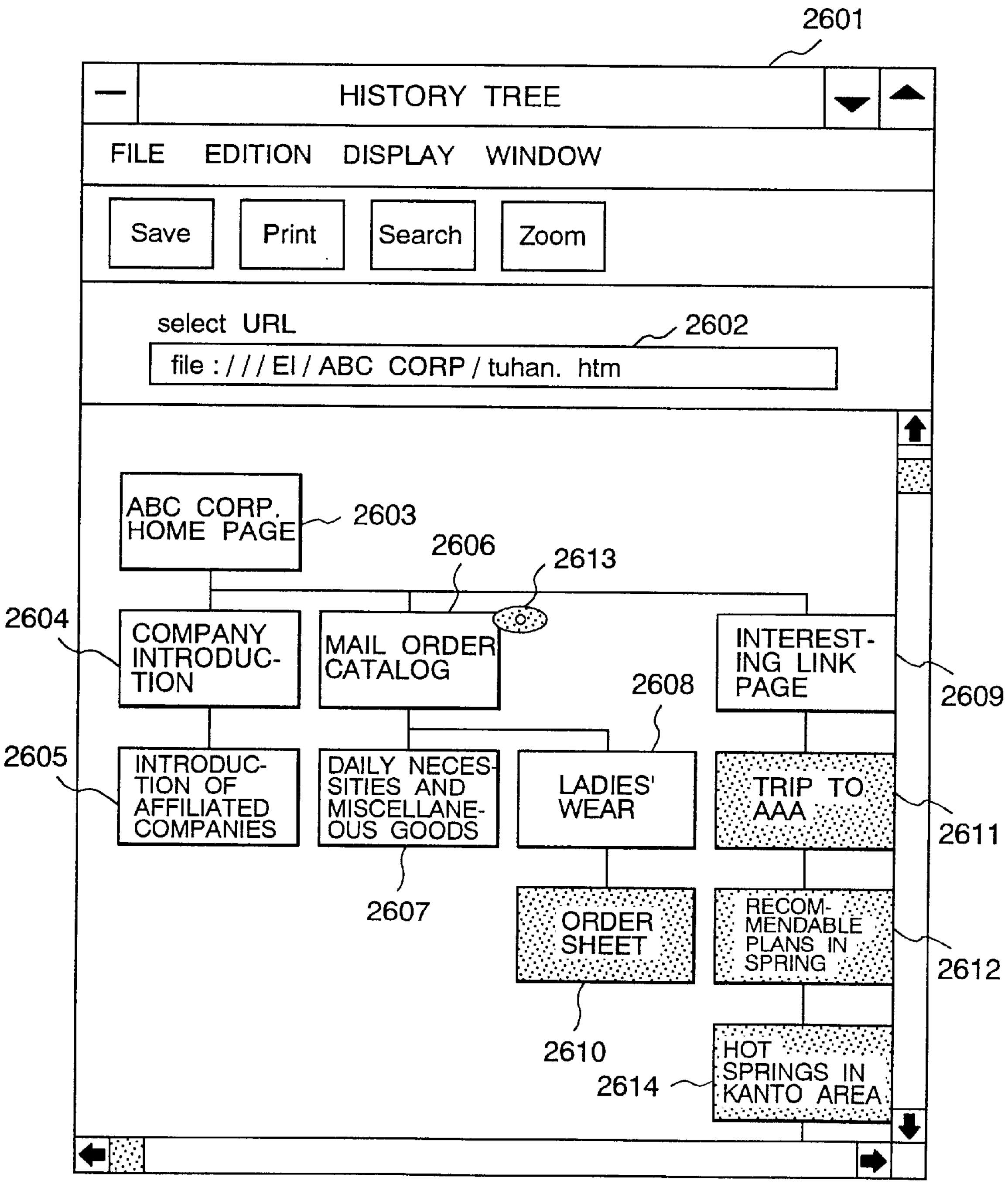
FIG. 35 is a display screen of a transition history tree displaying history information in the link information display according to the invention.

The browser interlocked history display means 2109 in FIG. 30 will be described. FIG. 35 shows an example of a transition history tree displaying history information interlockingly with the WWW browser by using the page construction image of FIG. 31 as an example in the browser interlocked history displaying means 2109 according to the invention.

In FIG. 35, reference numeral 2601 denotes a transition history tree and 2602 indicates a display column of an address of page information to be selected. Page information on the CD-ROM 2103 is written in boxes 2603 to 2609 and page information on the WWW server (communication medium) 2105 is written in dotted boxed 2610 to 2612. Reference numeral 2613 denotes a cursor and 2614 indicates page information being displayed by the WWW browser.

The transition history tree 2601 is started with the activation of the WWW browser and an address of page information displayed to the WWW browser is obtained and held. When moving to another page, the link contents are showed in a tree and the tree is updated and displayed. As a correspondence to the link system using the common description, the page information 2603 to 2609 on the CD-ROM 2103 and the page information 2610 to 2612 on the WWW server 2105 are displayed in different colors, and further, the page information 2614 being currently displayed is displayed so as to blink.

The transition history tree 2601 is used to easily reread the page information which has been read.

The history information link in FIG. 35 relates to an example of a transition history of the page information shown in FIG. 31. When the cursor 2613 is moved to indicate the box of desired page information, for example, when the cursor 2613 is moved to indicate the page information 2606 of "the mail order catalog", since the page information 2606 belongs to the CD-ROM 103, the arrow cursor is changed to the CD-ROM cursor 2613 and the address of the page information is displayed in the display column 2602. When the box is clicked, the WWW browser operates interlockingly and the page information of the selected box is read.

According to the example of FIG. 35, the page information 2614 of "hot springs in the Kanto area" belongs to the WWW server 2105, the page information 2606 of "the mail order catalog" belongs to the CD-ROM 2103, and there is no mutual link between the pages. The page information 614 of "hot springs in the Kanto area" is currently displayed by the WWW browser. When the cursor 2613 is moved to indicate the "mail order catalog" page 2606, the URL of the "mail order catalog" page information 2606 is displayed in the address column 2602. When the page information 2606 is clicked, the URL information displayed in the address column 2602 is issued to the WWW browser and the WWW browser reads and displays again the "mail order catalog" page information 2606.

According to the conventional WWW browser, since there is no transition information in the history information but only title characters are displayed and the number of title characters is limited, the information cannot be freely read again. In the link system using the common description, it is impossible to return from the page information on the WWW server 2105 to information of the CD-ROM 2103 having no actual mutual link.

However, by the transition history tree 2601, as shown in the embodiment, if it is page information which is displayed once by the WWW browser, the information can be freely read again even in a case where there is no actual link with page information being displayed.

Although the above embodiment has been described on condition that the CD-ROM is used as peculiar information storing means, a storing medium in any system such as a magnetic recording system or a semiconductor recording system can be also used as long as it is a storing medium which can store and reproduce animation, audio data, and texts.

According to the invention, information of the peculiar information storing means such as a CD-ROM and information of the common information storing means such as a WWW server connected via the communication line are described in the common description system, thereby linking and displaying the information. The name of information which can be selected and the icon image expressing the means to which the information belongs are also displayed.

Further, since the communication start notifying page is displayed when the display of the information belonging to the peculiar information storing means is transitioned to the display of the information belonging to the common information storing means, the user can easily preliminarily confirm the information medium to be used.

The cursor and icon images expressing information storing medium to which the information being currently displayed and to be displayed next belong are displayed, thereby notifying of the information storing medium. Consequently, the information can be easily selected and the information medium can be easily confirmed.

Further, by holding the history of information display and displaying it in the transition history tree, the transition history of the page information displayed in the past can be recognized at a glance.

An operation to return to the desired page information display is facilitated even between information having no actual mutual link relation such as the page information belonging to the common information storing means (WWW server) and the page information belonging to the peculiar information storing medium (CD-ROM).

What is claimed is:

1. A terminal having data reading means for reading data from a package medium, comprising:

communication means for communicating data with a server;

means for designating data by using the URL;

first judging means for reading conversion information for converting the URL to a path name from the package medium and for judging whether the designated URL can be converted to a path name or not;

converting means for converting the URL to a path name when the first judging means judges that the URL can be converted to a path name;

means for reading data from the package medium by using the path name obtained by the conversion;

second judging means for reading identifying information of the package medium and judging whether the data exists in another package or not when the first judging means judges that the URL cannot be converted to a path name; and displaying means for selection for displaying link destination information when the second judging means judged that the data exists in another package medium and for displaying a message allowing the user to select whether a package medium as a link destination is inserted into the terminal or the data is acquired from the server, wherein when the insertion of the package medium is selected by the displaying means for selection, the data is read from the package medium by the data reading means, and when the acquisition of data from the server is selected, the data is read out from the server by the communication means, and said package medium having hyper link information, wherein conversion information for converting a URL (Universal Resource Locator) of data stored in the package medium and a path name on the package medium, identification information for identifying whether the hyper link information is data stored in another package medium or not and medium in which the hyper link information is stored are recorded.

2. A terminal having means for reading data of a package medium and means for receiving and storing an electronic mail having one or more data and a URL of the data, comprising:

means for forming second conversion information for converting a URL of data of a received mail to a file name of the data of the received mail on the terminal;

storing means for storing the second conversion information;

means for designating data by using the URL;

first judging means for judging whether the designated URL can be converted to a file name by the second conversion information or not; and second judging means for reading conversion information for converting the URL to a path name and judging whether the designated URL can be converted to a path name or not, wherein data is obtained from the storing means of the terminal when the first judging means judges that URL can be converted to a file name irrespective of judgement of the second judging means, and said package medium having hyper link information, wherein conversion information for converting a URL (Universal Resource Locator) of data stored in the package medium and a path name on the package medium, identification information for identifying whether the hyper link information is data stored in another package medium or not, and medium in which the hyper link information is stored are recorded.

3. A terminal having means for receiving and storing the electronic mail, comprising:

means for forming data for managing correspondence between a hyper link of a received mail and information regarding a package medium;

storing means for storing the correspondence formed by the above means;

means for designating data by using the URL; and display/selection means for displaying corresponding link destination information when the designated URL exists in the correspondence and also displaying a message for allowing the user to select whether to insert a package medium of the link destination into the terminal or to obtain data from the server, wherein data is read out from the package medium by the data reading means when the insertion of the package medium is selected by the display/selection means and data is read out from the server by the communication means when the acquisition of data from the server is selected, and said electronic mail including hyper link information regarding a package medium in which data of a hyper link destination is stored is included.

* * * * *